| (12) | United States Patent | (10) Patent No.: US 10,309,731 B2 |
|---|---|---|
| | Frechette et al. | (45) Date of Patent: Jun. 4, 2019 |

(54) COMPLIANT HEATING SYSTEM COMPRISING A COMPRESSIVE SEAL EXPANSION JOINT

(71) Applicant: FULTON GROUP N.A., INC., Pulaski, NY (US)

(72) Inventors: Alexander Thomas Frechette, Mexico, NY (US); Carl Nicholas Nett, Sandisfield, MA (US); James Pettiford, Jamesville, NY (US); Richard James Snyder, Mexico, NY (US); Thomas William Tighe, Pulaski, NY (US); Keith Richard Waltz, Sandy Creek, NY (US)

(73) Assignee: FULTON GROUP N.A., INC., Pulaski, NY (US)

( * ) Notice: Subject to any disclaimer, the term of this patent is extended or adjusted under 35 U.S.C. 154(b) by 46 days.

(21) Appl. No.: 15/217,243

(22) Filed: Jul. 22, 2016

(65) Prior Publication Data

US 2017/0023316 A1 Jan. 26, 2017

Related U.S. Application Data

(60) Provisional application No. 62/282,039, filed on Jul. 24, 2015.

(51) Int. Cl.
*F28F 9/26* (2006.01)
*F28F 9/02* (2006.01)
(Continued)

(52) U.S. Cl.
CPC ............. *F28F 9/26* (2013.01); *F16L 17/02* (2013.01); *F28F 9/0236* (2013.01); *F28D 7/16* (2013.01);
(Continued)

(58) Field of Classification Search
CPC ...... F28F 2230/00; F28F 9/001; F28F 9/0236; F28F 9/0246; F28F 2265/26; F28F 9/26;
(Continued)

(56) References Cited

U.S. PATENT DOCUMENTS 3,317,223 A * 5/1967 Ingraham et al. .... F16L 51/023
165/157
3,724,878 A 4/1973 Ford
(Continued)

FOREIGN PATENT DOCUMENTS

EP 1 048 343 A2 11/2000
JP 2789558 B2 * 8/1998 ............... C10B 1/10
(Continued)

OTHER PUBLICATIONS

International Search Report for International Application No. PCT/US2016/043602 dated Nov. 1, 2016.
(Continued)

*Primary Examiner* — Tho V Duong
(74) *Attorney, Agent, or Firm* — McCormick, Paulding & Huber LLP

(57) ABSTRACT

A compliant heating system includes a dynamic component including a heat exchanger; a pressure vessel shell encompassing at least a portion of the heat exchanger; and a compressive seal expansion that connects the dynamic component and the pressure vessel shell.

20 Claims, 17 Drawing Sheets

(51) Int. Cl.
  *F16L 17/02* (2006.01)
  *F28D 7/16* (2006.01)
(52) U.S. Cl.
  CPC ....... *F28F 2230/00* (2013.01); *F28F 2265/26* (2013.01); *F28F 2275/08* (2013.01)
(58) Field of Classification Search
  CPC ....... F28F 2275/08; F16L 17/02; F16L 17/08; F16L 51/00; F16L 51/023; F28D 7/16
  See application file for complete search history.

(56) References Cited

U.S. PATENT DOCUMENTS

| | | | |
|---|---|---|---|
| 4,993,367 A | 2/1991 | Kehrer | |
| 2008/0202724 A1* | 8/2008 | Lorenz | F28D 7/0075 165/51 |
| 2009/0126918 A1 | 5/2009 | Campagna et al. | |
| 2012/0186780 A1 | 7/2012 | Ilgner et al. | |
| 2014/0008911 A1* | 1/2014 | Hartmann | F16L 21/06 285/373 |
| 2014/0090804 A1* | 4/2014 | Samz | F28F 1/022 165/81 |
| 2014/0299115 A1* | 10/2014 | Zhang | F28F 9/02 123/568.12 |

FOREIGN PATENT DOCUMENTS

| | | | |
|---|---|---|---|
| JP | 2001-108390 A | 4/2001 | |
| JP | WO 2014128924 A1 * | 8/2014 | ............. F16L 27/12 |
| KR | 20-1989-0011125 U | 7/1989 | |
| KR | 10-2010-0117468 A | 11/2010 | |

OTHER PUBLICATIONS

Written Opinion for International Application No. PCT/US2016/043602 dated Nov. 1, 2016.
International Search Report for International Application No. PCT/US2016/042035 dated Sep. 12, 2016.
Written Opinion for International Application No. PCT/US2016/042035 dated Sep. 12, 2016.

* cited by examiner

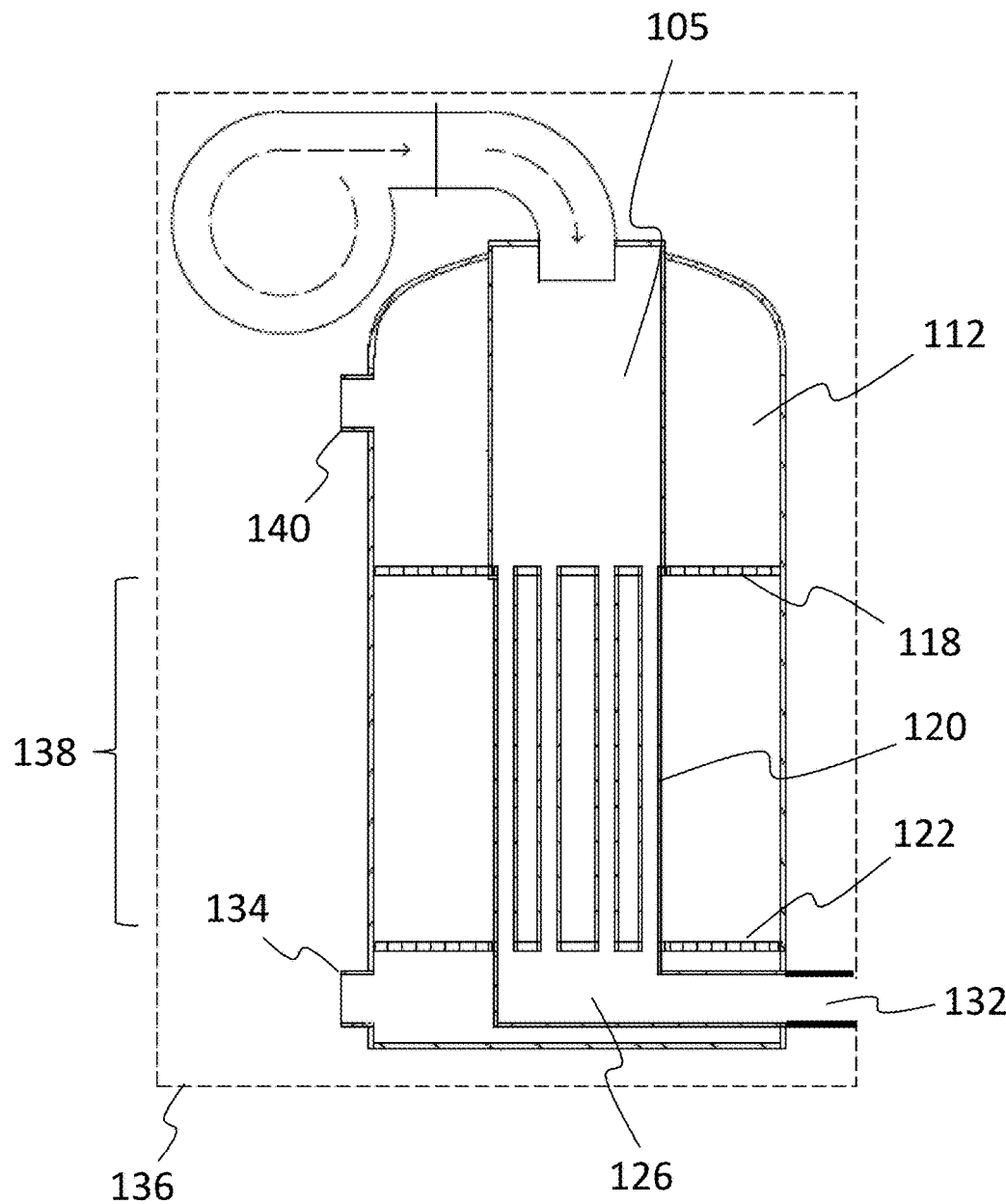

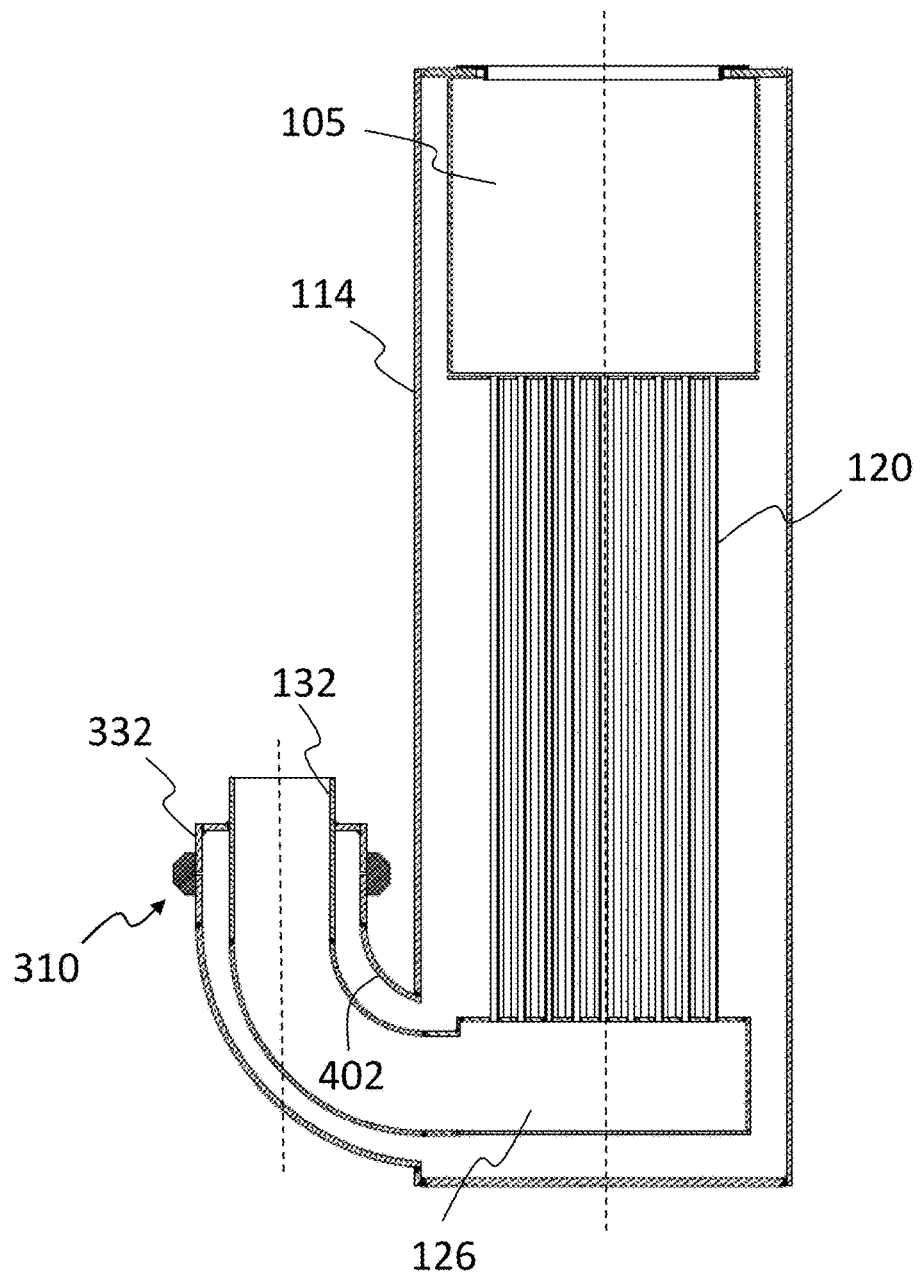

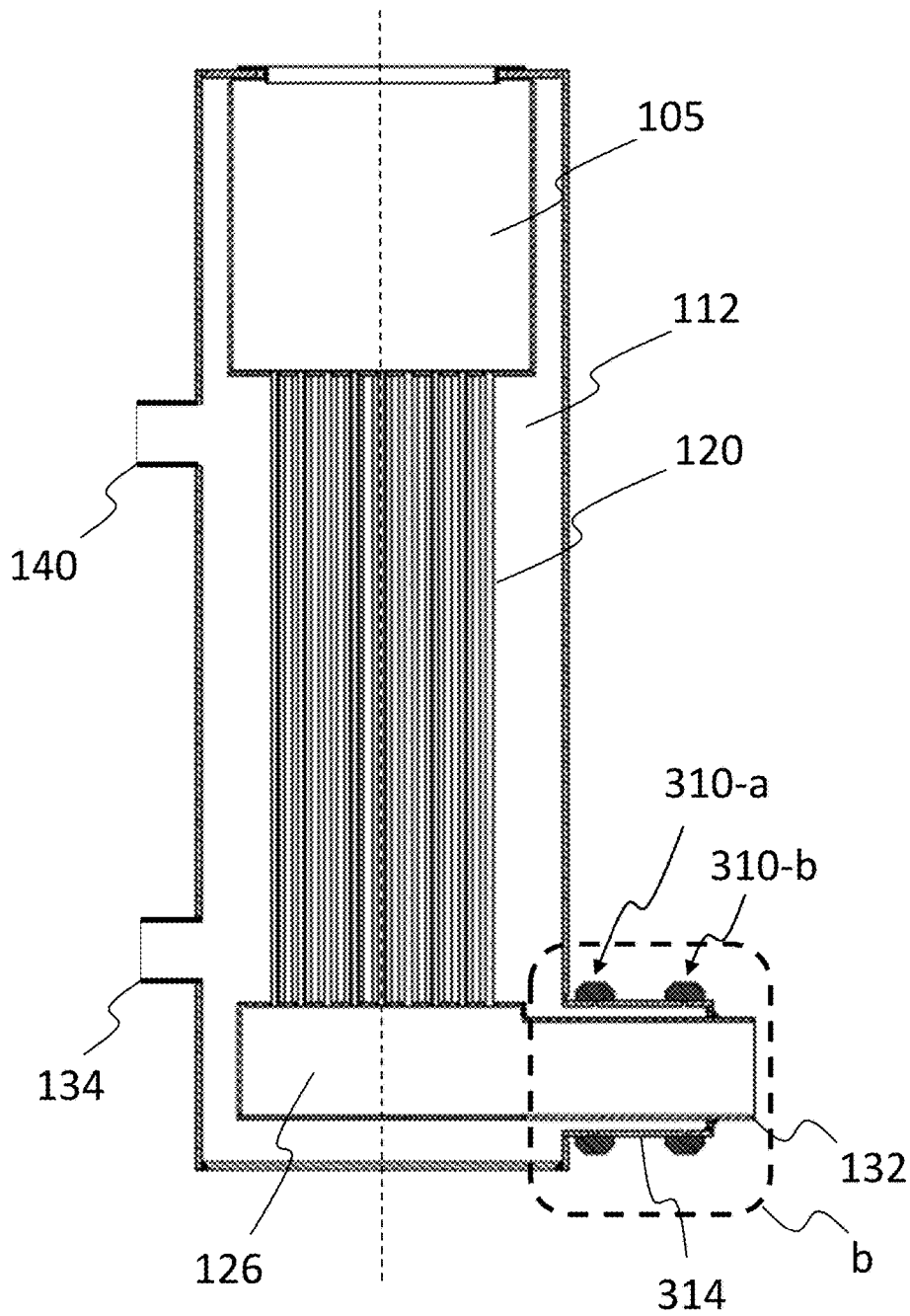

COMPLIANT HEATING SYSTEM COMPRISING A COMPRESSIVE SEAL EXPANSION JOINT

CROSS-REFERENCE TO RELATED APPLICATION

This application claims the benefit of U.S. Provisional Patent Application Ser. No. 62/282,039 filed Jul. 24, 2015, content of which is incorporated herein in its entirety by reference.

BACKGROUND

(1) Field

This application relates to a compliant heating system, methods of manufacture thereof, and method of using the compliant heating system.

(2) Description of the Related Art

Heating systems can fail due to mechanical stress, which develops from differential thermal expansion of components of the heating system during heating or cooling of the system. The mechanical stress develops because components that undergo different amounts of thermal expansion are rigidly connected. The different amounts of thermal expansion can occur because the components are heated to different temperatures, or because the components have different thermal expansion properties, for example. For example, longitudinal thermal expansion of heated components, e.g., a furnace, combustor, and heat exchanger assembly, when rigidly attached in more than one location to other components, such as a pressure vessel shell can result in component failure. The occurrence of mechanical failure is particularly true of fluid heating systems for the production of hydronic (water), steam, and thermal fluid aimed at delivering hot liquid or steam for ambient temperature regulation, hot water consumption, commercial applications, and industrial process applications.

The mechanical stress induced by differential thermal expansion is present both in systems that incorporate tube-and shell heat exchangers and those that employ alternative heat exchanger designs, including tubeless heat exchangers. Techniques for mitigating the mechanical stress, such as complex floating head assemblies, curves and bends in the heat exchanger tubes, and compliant bellows/corrugations, all have drawbacks. For example, complex floating head assemblies located inside the pressure vessel are not readily inspectable, serviceable, or replaceable in the field and can have frequent maintenance; curves and bends in the heat exchanger tubes add compliance, but are not readily inspectable, serviceable, or replaceable and can increase the manufacturing cost and material failure risk; and compliant bellows or corrugations inside the pressure vessel are difficult to access, e.g., for inspection or repair, resulting in poor system and component field serviceability.

Therefore there remains a need for an improved heating system that can reduce or eliminate mechanical stress that arises due to differential thermal expansion.

SUMMARY

Disclosed herein is a compliant heating system including a compressive seal expansion joint.

Also disclosed are methods of manufacturing the compliant heating system.

Disclosed is a compliant heating system, including: a dynamic component including a heat exchanger; a pressure vessel shell encompassing at least a portion of the heat exchanger; and a compressive seal expansion joint that connects the dynamic component and the pressure vessel shell.

Also disclosed is a compliant heating system including: a dynamic component including a heat exchanger, an exhaust plenum that is disposed on an end of the heat exchanger, and an exhaust gas port; a pressure vessel shell encompassing at least a portion of the heat exchanger and including a pressure vessel shell conduit that is disposed along a lateral axis and on an end of the pressure vessel shell, wherein the exhaust gas port laterally extends through the pressure vessel shell conduit; and an inner conduit compressive seal expansion joint and an outer conduit compressive seal expansion joint disposed on the pressure shell conduit, wherein the exhaust gas port is connected to the pressure vessel shell conduit via the inner conduit compressive seal expansion joint and the outer conduit compressive seal expansion joint; wherein the pressure vessel shell conduit includes a pressure vessel flange; wherein the pressure vessel flange is connected to a first end of a pipe segment via the inner conduit compressive seal expansion joint, wherein a second end of the pipe segment is connected to a combustion gas exhaust port flange via the outer conduit compressive seal expansion joint, and wherein the combustion gas exhaust port flange is rigidly attached to the exhaust port via a connection flange.

Also disclosed is a method of manufacturing a compliant heating system, the method including: disposing a dynamic component including a heat exchanger in a pressure vessel shell; and connecting the dynamic component and the pressure vessel shell with a compressive seal expansion joint to manufacture the compliant heating system.

Also disclosed is a method of using the compliant heating system of any one of the preceding claims, the method including: directing a thermal transfer fluid through the heat exchanger to an exhaust gas port; and transferring heat from the thermal transfer fluid to a production fluid located in an inner production fluid area The above described and other features are exemplified by the following figures and detailed description.

BRIEF DESCRIPTION OF THE DRAWINGS

Referring to the figures, which are exemplary embodiments, and wherein the like elements are numbered alike and wherein the dashed line in FIGS. 5A, 6A, and 7A denotes an axial axis:

FIG. 2A is a cross-section view of an embodiment of a heating system wherein the exhaust flue is directed laterally out of the base;

FIG. 5A is a cross-section view of an embodiment of a compliant heating system including a U-tube exhaust flue, which is directed laterally out of the base;

FIG. 6A is a cross-section view of an embodiment of a compliant heating system wherein the exhaust flue is directed laterally out of the base;

DETAILED DESCRIPTION

Figure 1A:
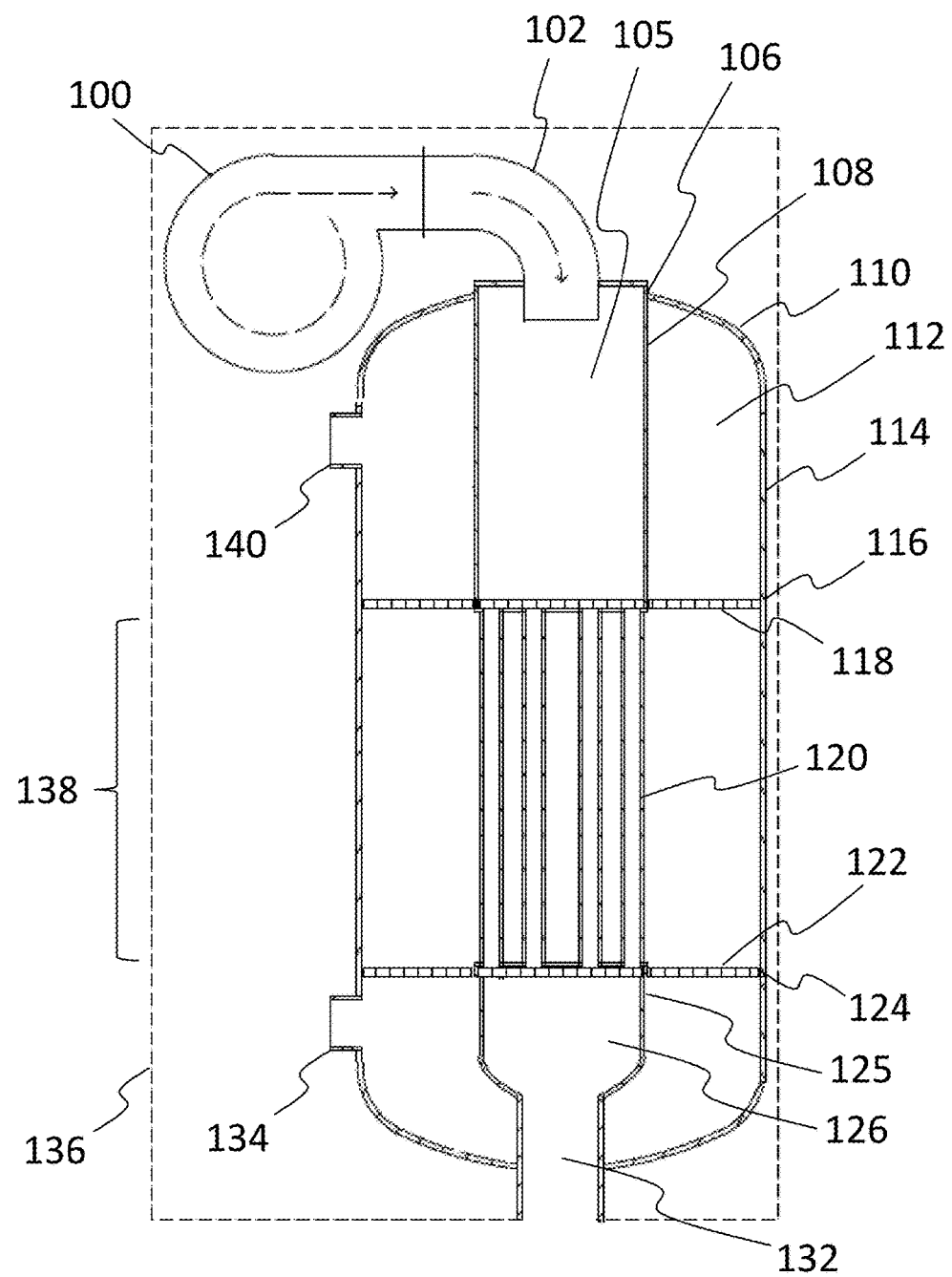
FIG. 1A is a cross-section view of an embodiment of a heating system wherein the exhaust flue is directed axially out of the base.

Differential thermal expansion over repeated thermal cycling of a heating system can result in the mechanical failure in regions of high stress concentration. For example, mechanical failure can occur at rigid attachment locations between components that experience thermal expansion and those that do not, or between components that experience different amounts of thermal expansion. The rigid attachment location can be, for example, between a dynamic component of the heating system and the pressure vessel shell. While not wanting to be bound by theory, it is understood that mechanical failure can be initiated by local cracking failure mechanisms. Once the initial cracks are formed, exposed metal within the cracks can undergo oxidation, leading to the formation of additional stresses at the crack tip, ultimately followed by crack propagation and component failure.

Component failure in heating systems can be expensive and difficult to repair in the field. For example, disassembly of the pressure vessel to extract the heat exchanger or furnace elements is time consuming and labor intensive, and reassembly often involves specialized welding or joining techniques \. Furthermore, fluid heating systems that incorporate methods for stress relief into the hot structures inside the pressure vessel (e.g., in the heat exchanger, in the combustion system, or in the furnace) are expensive and difficult to service, often prohibitively so, when the components of these stress relief devices fail.

In order to overcome one or more of these drawbacks, disclosed is an improved compliant heating system. The compliant heating system comprises a compressive seal expansion joint that allows for the reduction or near elimination of stresses that would otherwise arise at attachment points between components that experience different amounts of thermal expansion. Due to the reduction of stress in the compliant heating system, failure of heat exchanger elements, such as heat exchanger tubes, can be reduced.

The compliant heating system can be designed to localize a thermally-induced differential motion and mechanical stress specifically to the compressive seal expansion joint. In the absence of this systems-engineering approach to the design of the structure comprising the compressive seal expansion joint, the thermally-induced mechanical stress can be otherwise distributed throughout the heating system, concentrating the failure risk to weaker elements or joints and rendering the likelihood of failure and the location of the failure unpredictable. While not wanting to be bound by theory, it is believed that inclusion of the disclosed compressive seal expansion joint protects the expensive, delicate, and hard-to-reach components from mechanical stress-induced failure.

The inventors have surprisingly discovered that the compressive seal expansion joint can be located on the external pressure vessel shell or on an externally located conduit of the pressure vessel shell, where it is exposed and readily available for service. Since the compressive seal expansion joint can function to localize the differential motion and mechanical stress to an external location, the expensive, delicate, and hard-to-reach components can be protected from mechanical stress-induced failure with the added benefit that it can be easily inspected and serviced. It is noted that the external location refers a location external to the compliant heating system (such as one or both of the external pressure vessel shell or on an externally located conduit of the pressure vessel shell) and that the external location can be enclosed or at least partially enclosed, for example, with a removable cover or shield.

For example, the compressive seal expansion joint can be externally located on a pressure vessel shell or on an externally located conduit of the pressure vessel shell. An easily accessible compressive seal expansion joint allows field servicing without the use of specialized equipment or complex joining techniques, such as welding. In this manner, the compressive seal expansion joint can be regularly inspected for wear, cracking, or fatigue to enable problems to be addressed before component failure. This inspection can be performed periodically and can involve any suitable type of inspection, such as visual inspection, or non-destructive inspection for detecting wear, cracking, and material fatigue of the compressive seal expansion joint to anticipate and address problems before a failure occurs. A service life of the compliant heating system can therefore be improved, and can be 10 to 30 years or longer.

Moreover, the inventors have discovered that suitable thermal stress relief can be provided using serviceable components in both the axial and lateral exhaust configurations. In either orientation, thermal stress relief can be incorporated in an external location in an inspectable, removable, replaceable, and serviceable manner. Thus the serviceable components of the production fluid pressure vessel of a fluid heating system can be exposed for maintenance with little or no disassembly of the compliant heating system.

When the thermally-induced mechanical stress is localized to replaceable, compliant elements on the pressure vessel shell as disclosed herein, the pressure limits of the production fluid pressure vessel and can satisfy current safety standards for fluid heating system pressure vessels.

A compliant heating system can comprise a shell and tube heat exchanger, where heat from a thermal transfer fluid located in a tube is transferred to a production fluid located in the pressure vessel shell. The thermal transfer fluid can be generated and/or heated in a furnace, and can be a product of combustion of a fuel. The heated thermal transfer fluid can travel from the furnace through a tube to an exhaust plenum (also called an exhaust manifold), which is located at a distal end of the tube. The tube can comprise a plurality of heat exchanger tubes. An upper tube sheet can be located between the furnace and the tube and a lower tube sheet can be located at an opposite distal end of the tube and between the tube and the exhaust plenum. The pressure vessel shell can be fixedly attached to one or more of the furnace, the upper tube sheet, the lower tube sheet, or the exhaust plenum. The heat exchanger (for example, a tube), and optionally one or both of the furnace and the exhaust plenum, can be disposed within the pressure vessel shell.

The heat exchanger can exchange heat between the thermal transfer fluid and a production fluid, wherein the production fluid and the thermal transfer fluid can each independently comprise one or both of a gas and a liquid. Thus, the compliant heating system can be used as a gas-liquid, liquid-liquid, or gas-gas heating system. As used herein, the thermal transfer fluid is directed through the heat exchanger and does not contact the pressure vessel or the production fluid; and the production fluid is directed through the pressure vessel and is in contact with the inner surface of the pressure vessel shell and the outer surface of the heat exchanger.

The thermal transfer fluid can comprise a combustion gas, such as a gas produced by fuel fired combustor. The thermal transfer fluid can comprise one or more of water, steam, carbon monoxide, and carbon dioxide. The production fluid can comprise one or more of an ester, a diester, a glycol, a silicone, water, steam, an oil (such as petroleum oil and mineral oil), and a chlorofluorocarbon (such as a halogenated fluorocarbon, a halogenated chlorofluorocarbon, and a perfluorocarbon). A production fluid comprising glycol and water is specifically mentioned.

The compressive seal expansion joint can be located on one or both of the pressure vessel shell and a conduit of the pressure vessel shell. The conduit of the pressure vessel shell can be directed at an angle of 0 to 180° from the pressure vessel shell relative to axial axis of the pressure vessel shell. The conduit of the pressure vessel shell can be directed axially out of the base (for example, at an angle of 0°) or can be directed in a lateral direction relative to the axial direction of the pressure vessel shell (for example, at an angle of 90°). The conduit of the pressure vessel shell can comprise a bend. The bend can have a 0 to 180° bend relative to its axis of departure from the pressure vessel shell. For example, if the conduit is directed axially out of the pressure vessel shell, then the bend can have an angle of 0 to 180° relative to the axial axis, and if the conduit is directed laterally out of the pressure vessel shell, then the bend can have an angle of 0 to 180° relative to the lateral axis. Any suitable bend can be used. A bend having an angle of 90° is mentioned.

FIG. 1A and FIG. 2A are cross-section views of an embodiment of a heating system in which the exhaust flue is directed axially out of the base and is directed laterally out of the base, respectively. In the figures, fan blower 100 forces air into combustion furnace 105 through conduit 102. When a combustion furnace is present, the combustion furnace can generate a thermal transfer fluid (e.g., hot air) and combustion products, for example, by gas combustion, oil combustion, petroleum fuel combustion, electric energy conversion, or any combination thereof. In the absence of a combustion furnace, hot gasses can be supplied by any suitable source, for example, exhaust from a high temperature turbine, or high pressure boiler. The thermal transfer fluid travels through heat exchanger section 138 extending from upper tube sheet 118 to lower tube sheet 122 via heat exchanger tubes 120 to exhaust plenum 126 and exits via exhaust gas port 132. The production fluid enters the heating system via inlet port 134, traverses heat exchanger section 138, enters inner production fluid area 112, and exits through outlet port 140. It is noted that upper tube sheet 118 and lower tube sheet 122 can be fixedly attached to pressure vessel shell 114, as illustrated in FIG. 1A and FIG. 2A, for example, to improve the structural support of the heating system, or can have a width less than that of pressure vessel shell 114 such as is illustrated in FIG. 4B. When upper tube sheet 118 and lower tube sheet 122 are fixedly attached to pressure vessel shell 114, upper tube sheet 118 and lower tube sheet 122 can allow for the production fluid to pass through the respective sheets. Conversely, one or both of upper tube sheet 118 and lower tube sheet 122 can prevent the through flow of the production fluid.

Figure 1B:
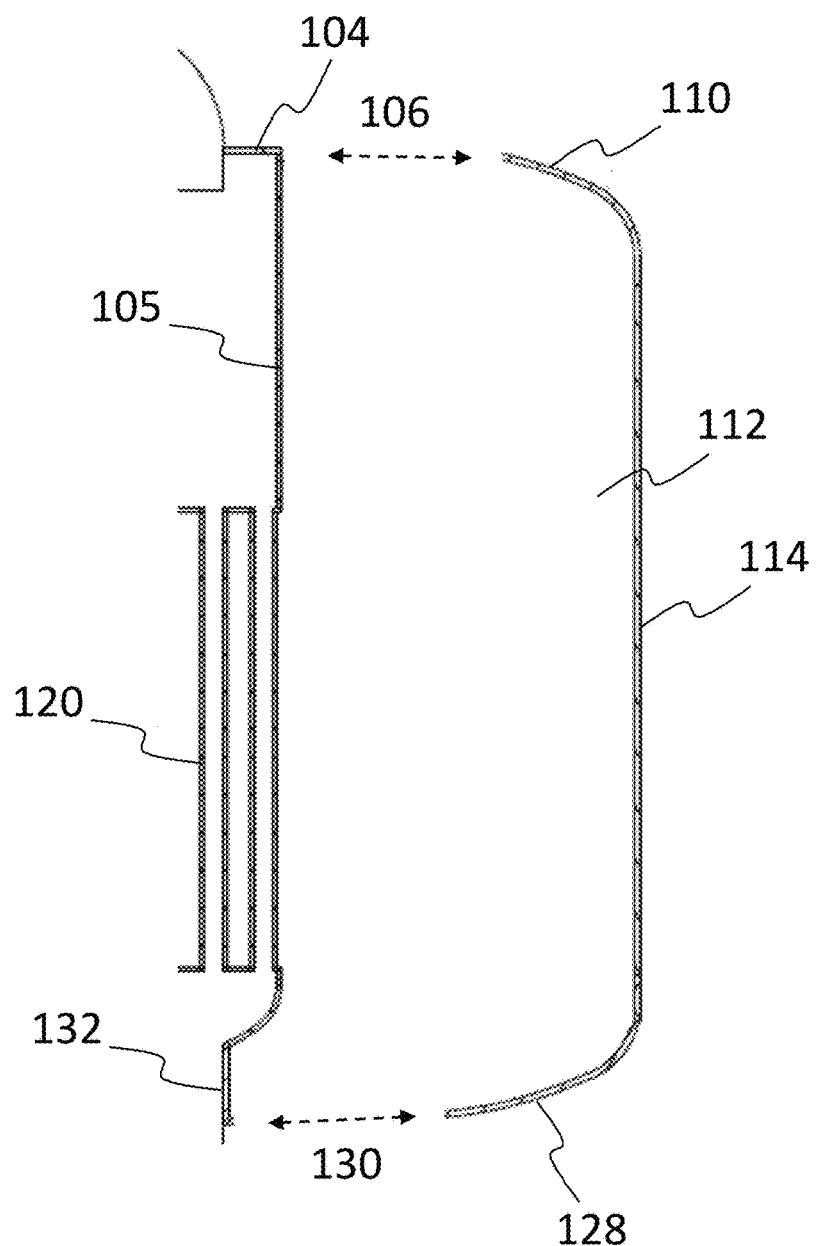
FIG. 1B is an expanded view of a portion of FIG. 1A showing attachment points of the heating system.
Figure 2B:
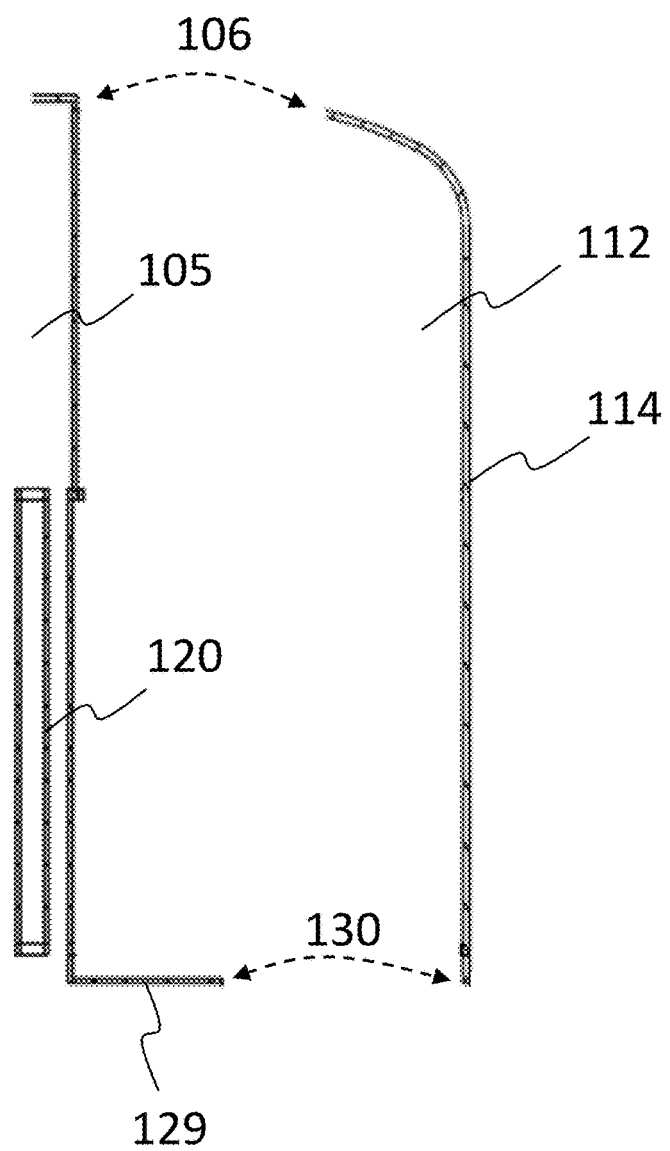
FIG. 2B is an expanded view of a portion of FIG. 2A showing attachment points of the heating system.

Pressure vessel shell 114 can be fixedly attached at one or more attachment points, including, but not limited to furnace wall 108 (for example, at furnace head attachment point 106), to a tube sheet (for example at upper tube sheet attachment point 116 and at lower tube sheet attachment point 124), and to exhaust plenum wall 125 (for example, at bottom head attachment point 130). As shown in FIG. 1B, the pressure vessel shell 114 can comprise a pressure vessel shell top head 110, which is fixedly attached to furnace head 104 at furnace head attachment point 106, and a pressure vessel shell bottom head 128, which is fixedly attached at bottom head attachment point 130. As shown in FIG. 2B, the pressure vessel shell 114 can be fixedly attached to furnace head 104 at furnace head attachment point 106 and pressure vessel shell 114 can be fixedly attached to flange 129 at bottom head attachment point 130.

A body cover 136 can be removably attached to provide for easy access to the heating system. Alternatively, or in addition, the body cover 136 can comprise one or more removable panels to facilitate access for service and maintenance. When the body cover 136 is removed or opened, one or more of the exterior components of the heating system can be accessed. Examples of exterior components can include, but are not limited to, furnace head 104, pressure vessel shell 114, exhaust plenum wall 125, and exhaust gas port 132. Also, because the pressure vessel shell is fixedly attached in proximity to the heat exchanger section, for example, by welding, the interior components, such as the heat exchanger tube and the furnace, are inaccessible.

Figure 3A:
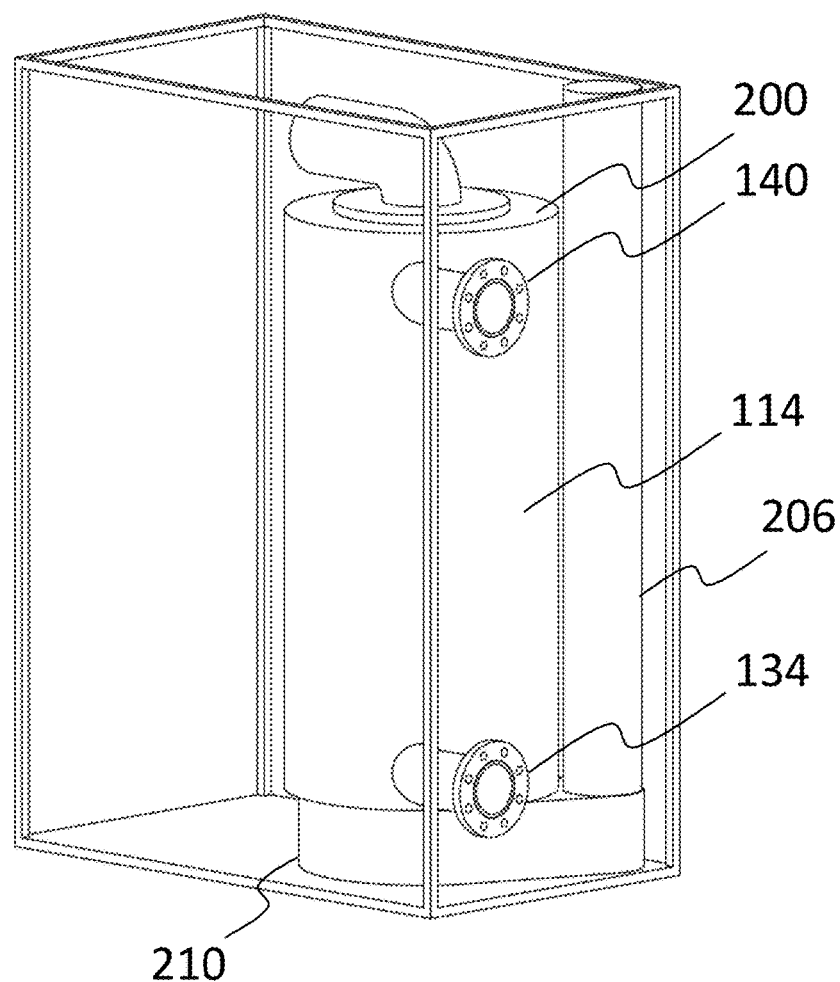
FIG. 3A is an illustration of an embodiment of a vertical standing heating system.
Figure 3B:
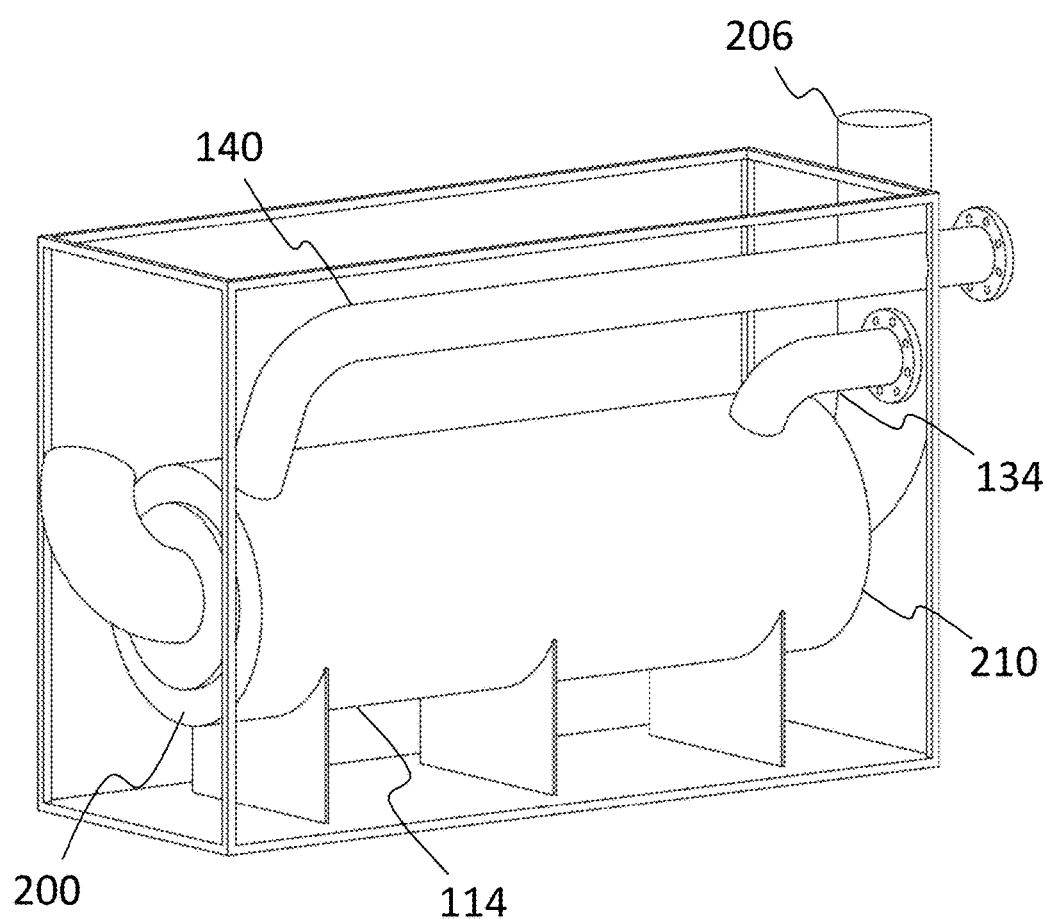
FIG. 3B is an illustration of an embodiment of a horizontal standing heating system.

FIG. 3A and FIG. 3B are illustrations of embodiments of a vertical standing heating system and of a horizontal standing heating system, respectively. As shown in FIG. 3A and FIG. 3B, exterior components are accessible when the body cover is removed. Specifically, FIG. 3A and FIG. 3B illustrate that accessible exterior components can comprise top head assembly 200, pressure vessel shell 114, base 210, exhaust flue 206, inlet port 134, and outlet port 140.

When the compliant heating system is quiescent, the furnace and heat exchanger assembly may be at room temperature, e.g., 23 to 25° C. In operation, the temperature of the furnace and heat exchanger are increased and the components expand. The expansion can occur in an axial direction, e.g., in a longitudinal direction along a major axis, for example, along a central axis of the compliant heating system. The components along the path of the thermal transfer fluid, such as the furnace, the upper tube sheet, the heat exchanger tube, the lower tube sheet, and the exhaust plenum can be subjected to high temperatures during the operation of the compliant heating system and can therefore undergo thermal expansion which is greater than a thermal expansion of the pressure vessel shell, which is in contact with the production fluid and thus remains at a lower temperature and thus can undergo little to no thermal expansion during operation. Along the axial direction of the fluid heating system, the expansion of the individual metal components can be additive.

For example, the inventors have modelled exemplary boilers having a thermal input of only less than 880 kilowatts (kW) can experience more than 0.5 mm of unconstrained differential thermal expansion. In constrained systems, this low level of thermal expansion could result in peak stresses of greater than or equal to 150 megapascal (MPa). Conversely, the presently disclosed compliant heating systems that allow for the expansion of the dynamic component, the peak stresses under the same conditions can be reduced, for example, to only about 40 MPa, which could exist almost completely in the radial direction. This reduction in stress within the system can correspond to an increased lifetime of the components therein.

As is described herein, a compressive seal expansion joint can be used to alleviate or eliminate stresses that arise due to the differential thermal expansion that occurs during operation of the compliant heating system. The compressive seal expansion joint can comprise a gasket 326, which covers an expansion gap, and a retaining ring 320, which is disposed around the gasket. The gasket can function to seal the expansion gap and prevent an internal fluid, e.g., the production fluid, from leaking out of the compressive seal expansion joint and can also function to provide a flexible element that can form an articulated hinge with one or more degrees of freedom of movement. An embodiment in which the gasket provides three degrees of freedom of movement is mentioned. One or both of a width and an angle of the expansion gap can increase and decrease depending on the differential thermal expansion of the compliant heating system. The width of the gap when the system is at room temperature, e.g., 23 to 25° C., can be greater than 0 to 5 millimeters (mm), or 1 to 5 mm, or 1 to 4 mm.

The gasket can comprise any suitable material, such as an elastomer. The gasket can comprise one or more of a styrene based elastomer (such as styrene-butadiene-styrene (SBS) block copolymer, a styrene-ethylene-butadiene-styrene (SEBS) block copolymer, a styrene-(styrene butadiene)-styrene block copolymer, a styrene butadiene rubber (SBR), an acrylonitrile-butadiene-styrene copolymer (ABS)), a butadiene rubber (BR), a natural rubber (NR), an isoprene rubber (IR), an ethylene-propylene-diene monomer (EPDM) (for example, a partial or complete hydride thereof), a fluoroelastomer (such those derived from one or more of vinylidene fluoride, hexafluoropropylene, pentafluoropropylene, tetrafluoroethylene, and chlorotrifluoroethylene), and a nitrile material.

The retaining ring can provide an internal channel to house the gasket. The retaining ring can be a flexible retaining ring or can be a rigid retaining ring, and can comprise a hinge to allow for the retaining ring to be easily added or removed. The retaining ring can be secured to the compliant heating system by a fixing means. Examples of fixing means include a threaded bolt (such as that illustrated in FIG. 4C), a clasp, a lock, a snap, or a draw latch.

Figure 8:
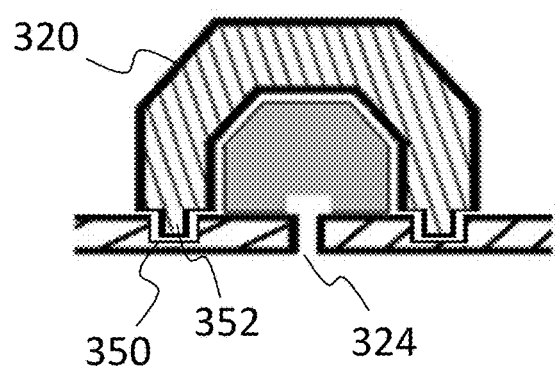
FIG. 8 is a cross-section view of a compressive seal expansion joint.

One or more positioners can be used to guide the retaining ring to maintain a lateral position on the pressure vessel shell. The positioner can comprise one or both of a protrusion, such as ridge 352, and a corresponding depression, such as slot 350. The depression or the protrusion of the positioner can be located on the pressure vessel shell or on a pressure vessel shell conduit. In an embodiment, one of the retaining ring and the pressure vessel shell includes a protrusion, such as a ridge or stud that can fit into a corresponding depression, such as a slot or a well, which is disposed in the other of the retaining ring and the pressure vessel shell. For example, FIG. 8 illustrates that retaining ring 320 can comprise a ridge 352 that correspond to slot 350.

The compressive seal expansion joint can be located on an exterior component of the compliant heating system. The compressive seal expansion joint can be located on the pressure vessel shell, e.g., on an exterior surface of the pressure vessel shell. The pressure vessel shell can comprise a pressure vessel shell conduit which extends from an end or from a side of the pressure vessel shell, and the compressive seal expansion joint can be located on the pressure vessel shell conduit, e.g., on an exterior surface of the pressure vessel shell conduit. The pressure vessel shell and the dynamic components, such as the furnace, the upper tube sheet, the lower tube sheet, and the exhaust plenum, can be attached via the compressive seal expansion joint and a rigid attachment point, for example, a single rigid attachment point, allowing for the differential thermal expansion of the dynamic components and the pressure vessel shell with reduced mechanical stress.

The compressive seal expansion joint can accommodate a total axial deflection of the dynamic components of 0.01 to 15 millimeters (mm), or 0.1 to 8 mm, or 0.1 to 5 mm, or 0.01 to 5 mm.

The compressive seal expansion joint can contain a pressurized production fluid in the pressure vessel shell. In an embodiment, the compressive seal expansion joint can contain a production fluid having a pressure of 50 to 1,750 kilopascals (kPa), 100 to 1,400 kPa, or 200 to 1,200 kPa.

The compressive seal expansion joint can have a fatigue life of 150,000 to 1,000,000 cycles, where 1 cycle is equal to one heating and cooling cycle of the compliant heating system.

It has been further unexpectedly discovered that use of a plurality of compressive seal expansion joints results in synergistic effects resulting in further improved performance. While not wanting to be bound by theory, it is believed that use of a plurality of compressive seal expansion joints provides for an improved ability to accommodate complex stress, such as stress which develops from angular displacement, resulting in torque, as is further disclosed in conjunction with FIG. 6E and FIG. 6F below. The compliant heating system may comprise 2 to 10, 3 to 8, or 4 to 6 compressive seal expansion joints. An embodiment in which the compliant heating system comprises 2 compressive seal expansion joints is mentioned.

Figure 4A:
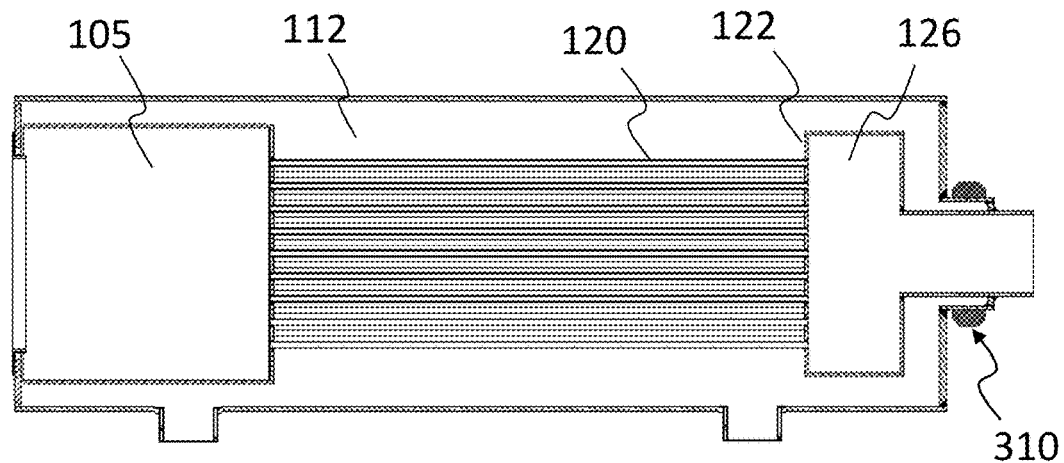
FIG. 4A is a cross-section view of an embodiment of a compliant heating system having a compliant pressure vessel conduit.
Figure 4B:
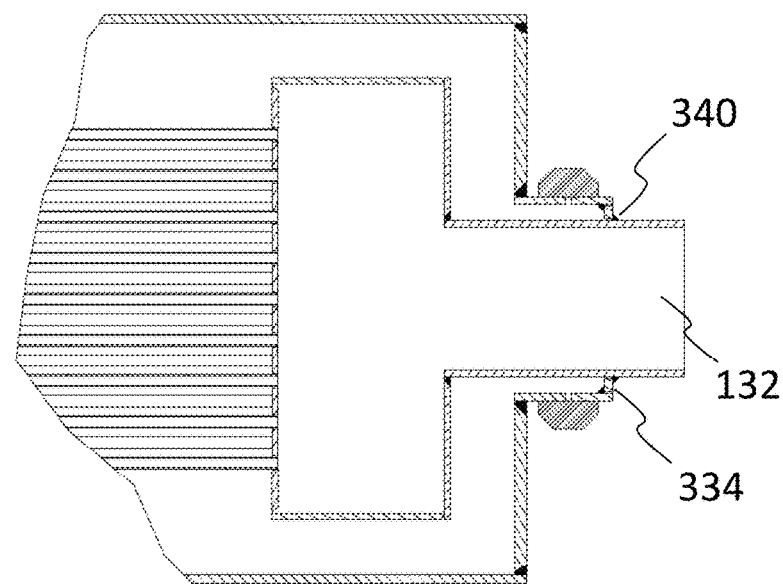
FIG. 4B is a cross-section view of a portion of FIG. 4A.
Figure 4C:
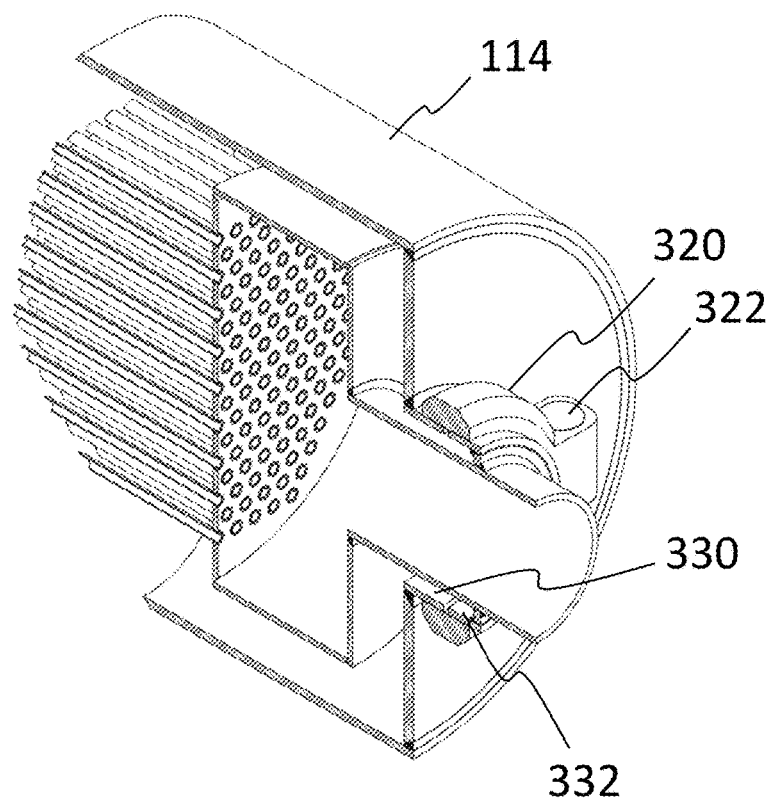
FIG. 4C is a perspective cut-away view of an embodiment of the compliant heating system of FIG. 4A.
Figure 4D:
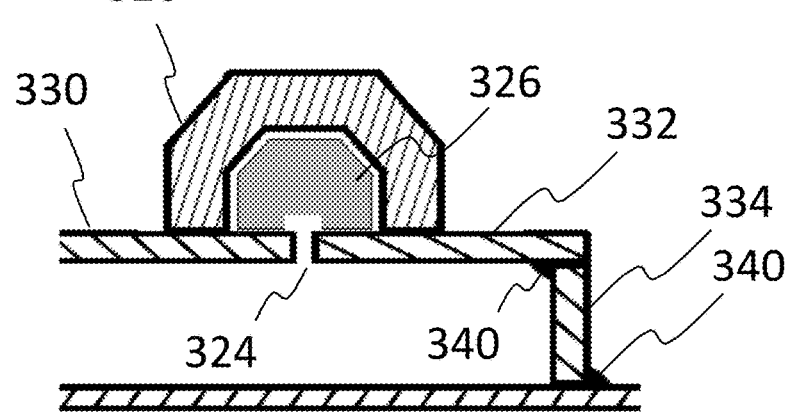
FIG. 4D is a cross-section view of the compressive seal expansion joint of shown in FIG. 4A.

FIGS. 4A to 4D illustrate an embodiment of a compliant heating system having a compressive seal expansion joint located on a pressure vessel shell conduit of the pressure vessel shell. As shown in FIG. 4A, the thermal transfer fluid travels from combustion furnace 105 through heat exchanger tubes 120 to exhaust plenum 126 and exits via exhaust gas port 132 that is directed axially out of the base. A base of the exhaust plenum can be pitched towards exhaust gas port 132 to facilitate removal of a condensate in condensing applications. Pressure vessel shell 114 can comprise pressure vessel flange 330 that laterally extends out of pressure vessel shell 114 and that can be located around a portion of exhaust gas port 132, for example, as illustrated in FIG. 4B and FIG. 4C. Pressure vessel flange 330 is connected to combustion gas exhaust port flange 332 via outer compressive seal expansion joint 310. Combustion gas exhaust port flange 332 can be rigidly connected to exhaust gas port 132 via connection flange 334, for example, via welds 340. Compressive seal expansion joint 310 comprises retaining ring 320 located around gasket 326, where gasket 326 is located over expansion gap 324, for example, as illustrated in FIG. 4D. Retaining ring 320 can be secured via threaded bolt 322, as illustrated in FIG. 4C. The pressure vessel flange 330 and the exhaust port flange 332 can define the expansion gap therebetween.

Figure 5B:
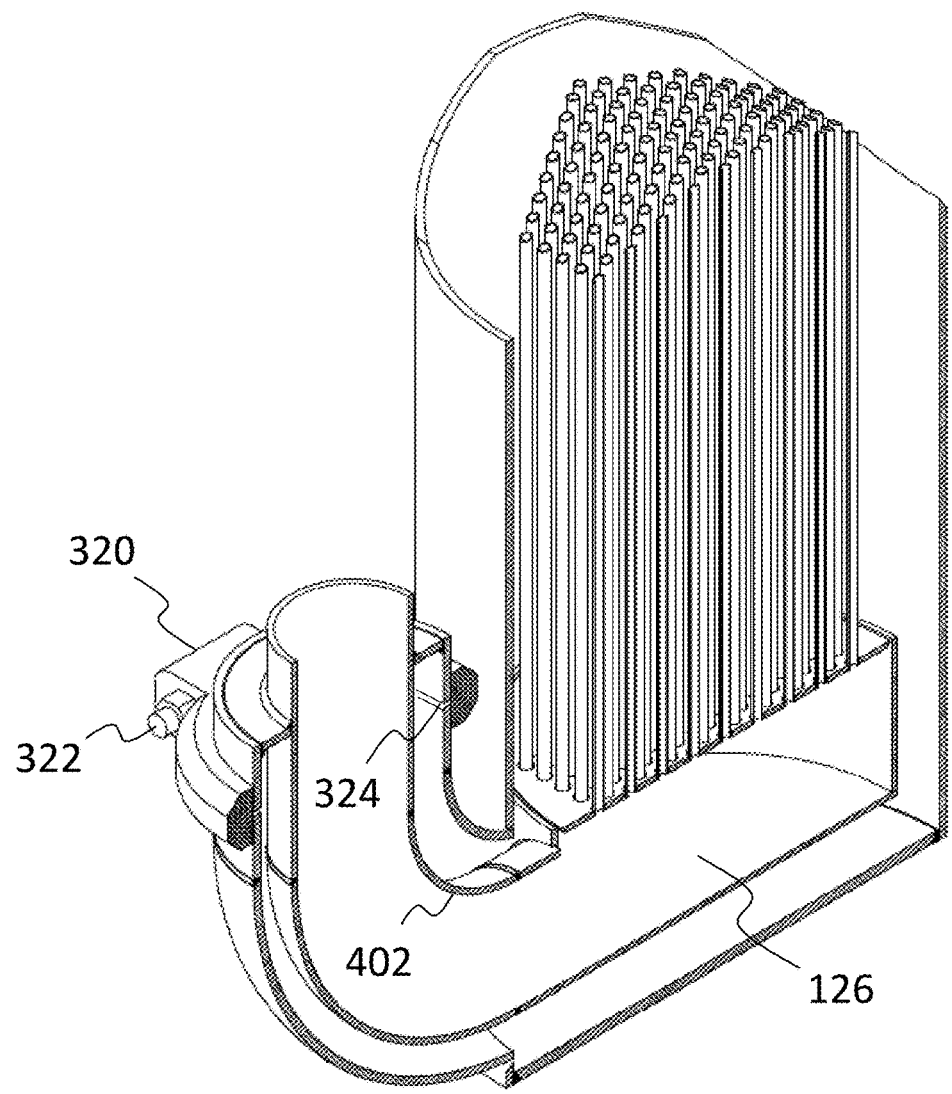
FIG. 5B is a perspective cut-away view of a portion of the compliant heating system of FIG. 5A.
Figure 5C:
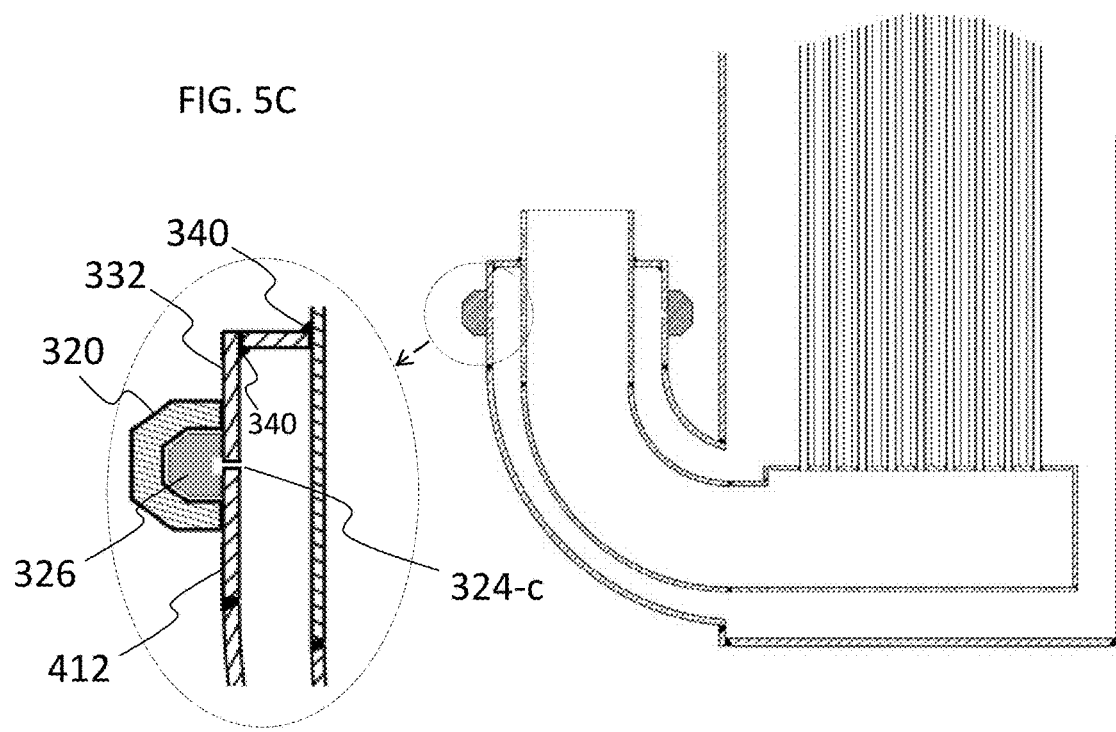
FIG. 5C is a cross-section view of the compressive seal expansion joint 310 shown in FIG. 5A when differential thermal expansion is not present.

FIGS. 5A to 5D show a cross-section view of another embodiment of the compliant heating system in which a U-tube exhaust flue is directed laterally out of the base. Due to the lateral directionality of the exhaust flue, the overall length of the compliant heating system can be reduced and can allow for a facilitated ducting of the exhaust gas. In FIG. 5A, the thermal transfer fluid travels from combustion furnace 105 through heat exchanger tubes 120 to exhaust plenum 126 and exits via exhaust gas port 132 that comprises the U-tube directed laterally out of the base. The pressure vessel shell 114 can comprise a curved pressure vessel shell conduit 402 that laterally extends out of pressure vessel shell 114 and that can be located around a portion of exhaust gas port 132, for example, as illustrated in FIG. 5A and FIG. 5B. Curved pressure vessel shell conduit 402 can be connected to combustion gas exhaust port flange 332 via compressive seal expansion joint 310. Curved pressure vessel shell conduit 402 can optionally comprise pressure vessel extension 412, for example, as is illustrated in FIG. 5C. Combustion gas exhaust port flange 332 can be rigidly connected to exhaust gas port 132 via connection flange 334, for example, via welds 340. Also, as shown in FIG. 5A, an axis of the compressive seal expansion joint 310 can be parallel to the axial direction of the of the pressure vessel.

Figure 5D:
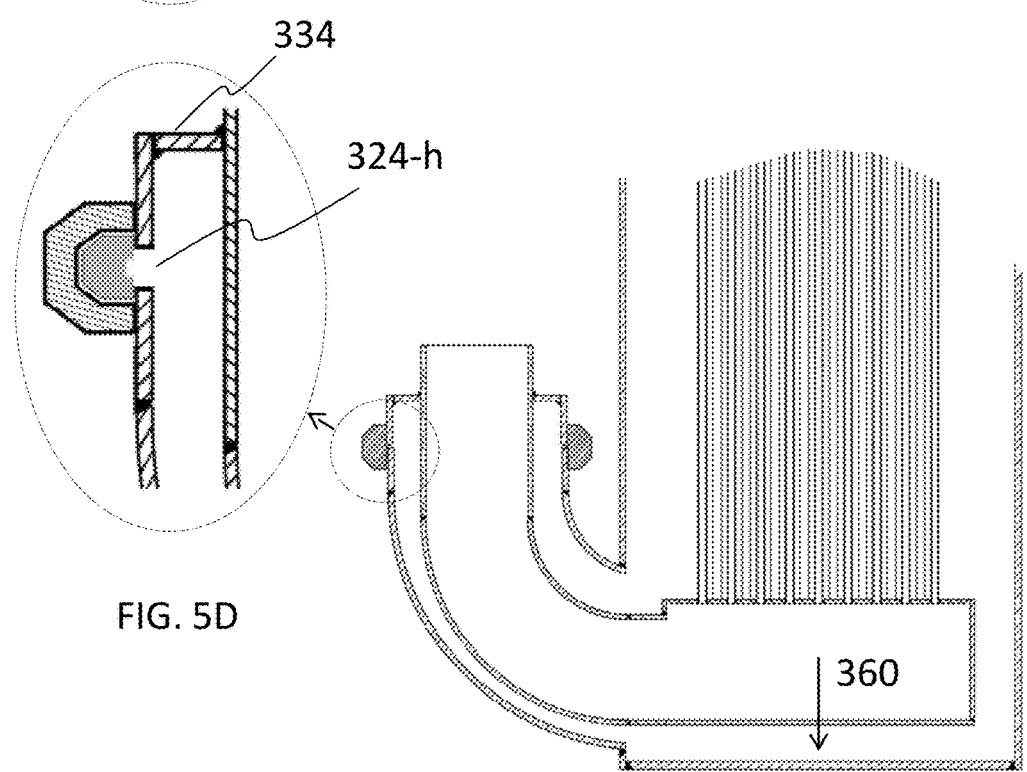
FIG. 5D is cross-section view of the compressive seal expansion joint 310 shown in FIG. 5A when differential thermal expansion is present.

FIG. 5C and FIG. 5D illustrate how a compressive seal expansion joint can accommodate the differential thermal expansion of the heating system. FIG. 5C illustrates a cooled state of the compliant heating system and FIG. 5D illustrates a heated state of the compliant heating system undergoing axial expansion 360. Axial expansion 360 of the dynamic components when heated can result in an increase in the gap width from initial cooled gap width 324-c to heated gap width 324-h of compressive seal expansion joint 310.

The compressive seal expansion joint illustrated in FIGS. 4A to 4D can function similarly to that illustrated in FIGS. 5A to 5D.

Figure 6B:
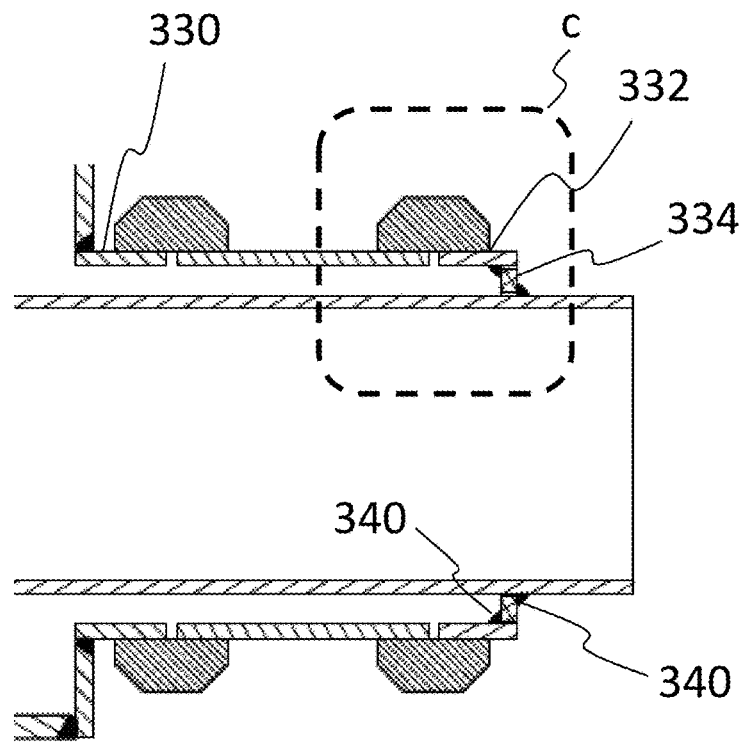
FIG. 6B is a cross-section view of region b of FIG. 6A.
Figure 6C:
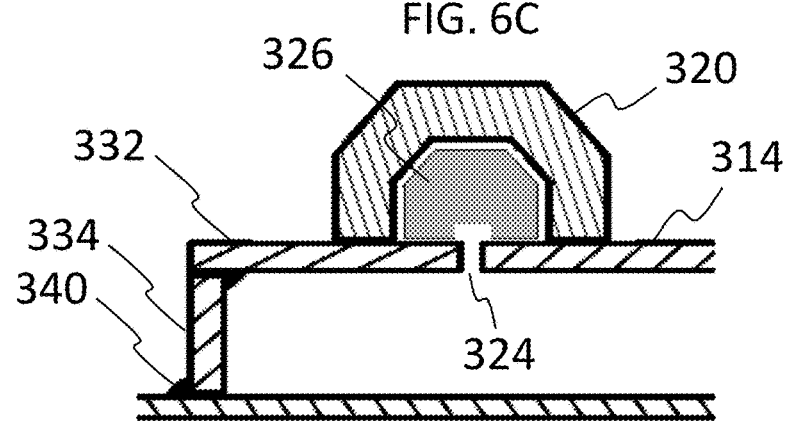
FIG. 6C is a cross-sectional section view of further illustrating the compressive seal expansion joint shown in region c of FIG. 6B.
Figure 6D:
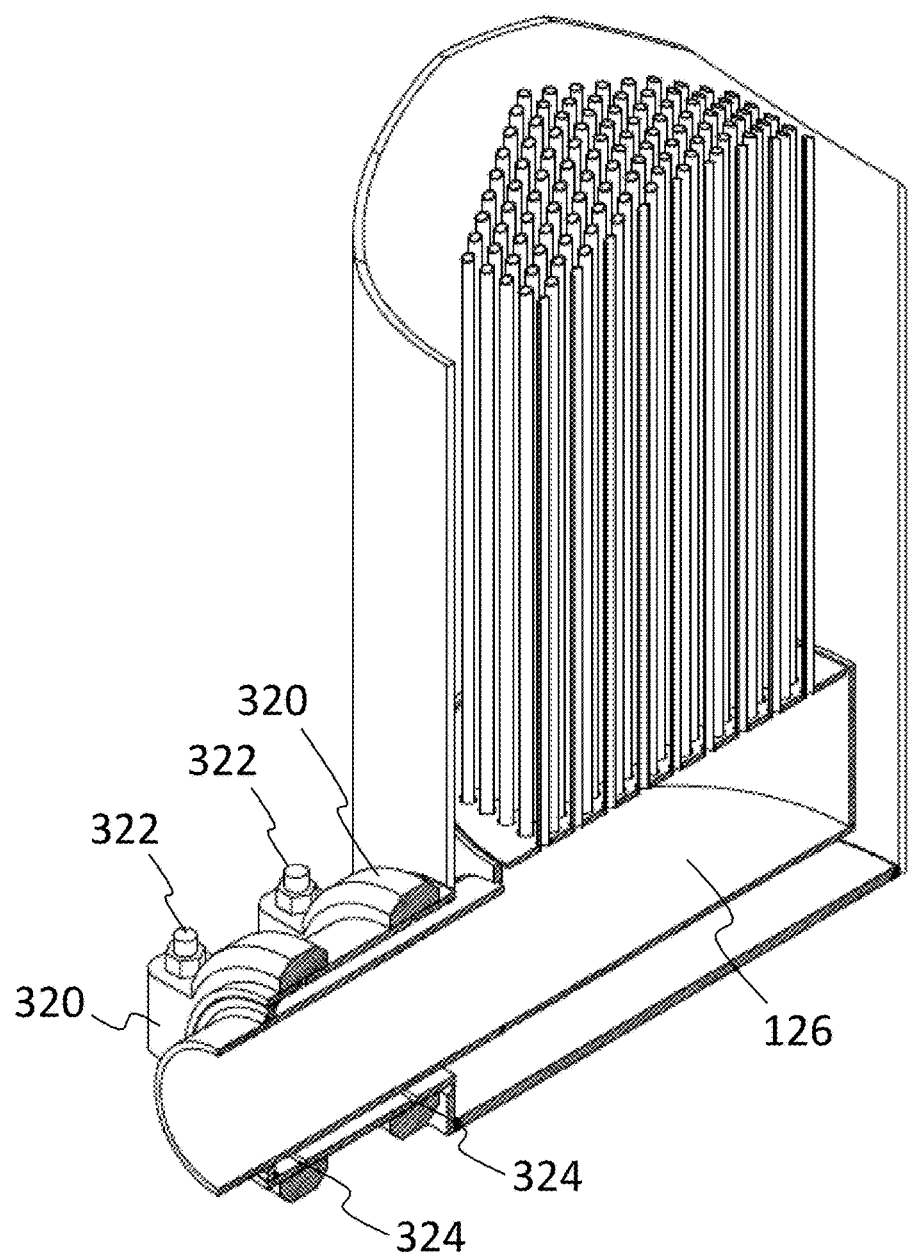
FIG. 6D is a perspective cut-away view of the compliant heating system of FIG. 6A.

FIGS. 6A to 6F illustrate an embodiment of a compliant heating system having two compressive seal expansion joints located on a conduit of the pressure vessel shell. In FIGS. 6A to 6F, the exhaust flue is directed laterally out of the base and two compressive seal expansion joints are disposed thereon. In the configuration of FIG. 6A, the thermal transfer fluid travels from combustion furnace 105 through heat exchanger tubes 120 to exhaust plenum 126 and exits via exhaust gas port 132 that is directed laterally out of the base. Pressure vessel shell 114 can comprise pressure vessel flange 330 that laterally extends out of pressure vessel shell 114 and that can be located around a portion of exhaust gas port 132, for example, as illustrated in FIG. 6B and FIG. 6C. Pressure vessel flange 330 can be connected to a first end of pipe segment 314 via inner compressive seal expansion joint 310-a and a second end of pipe segment 314 can be connected to combustion gas exhaust port flange 332 via outer compressive seal expansion joint 310-b. Combustion gas exhaust port flange 332 can be rigidly connected to exhaust gas port 132 via connection flange 334, for example, via welds 340. Each of inner compressive seal expansion joint 310-a and outer compressive seal expansion joint 310-b comprise retaining ring 320 located around gasket 326, where gasket 326 is located over expansion gap 324, for example, as illustrated in FIG. 6C. Retaining ring 320 can be secured via threaded bolt 322, as illustrated in FIG. 6D.

Figure 6E:
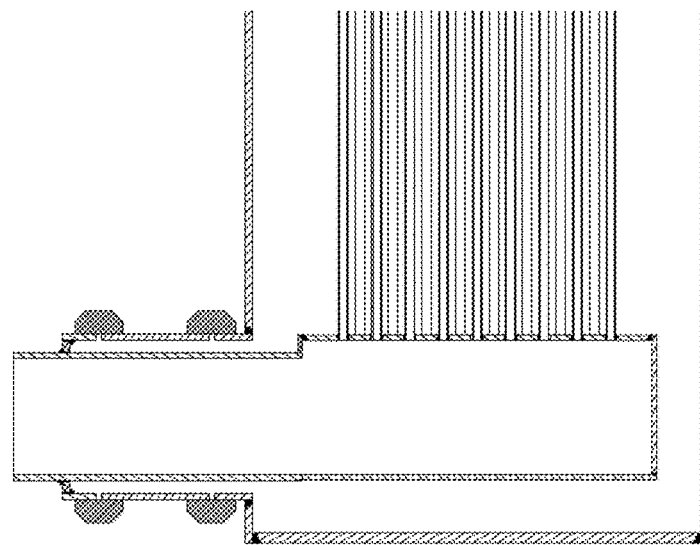
FIG. 6E is a cross-section view of the compliant heating system of FIG. 6A when differential thermal expansion is not present.
Figure 6F:
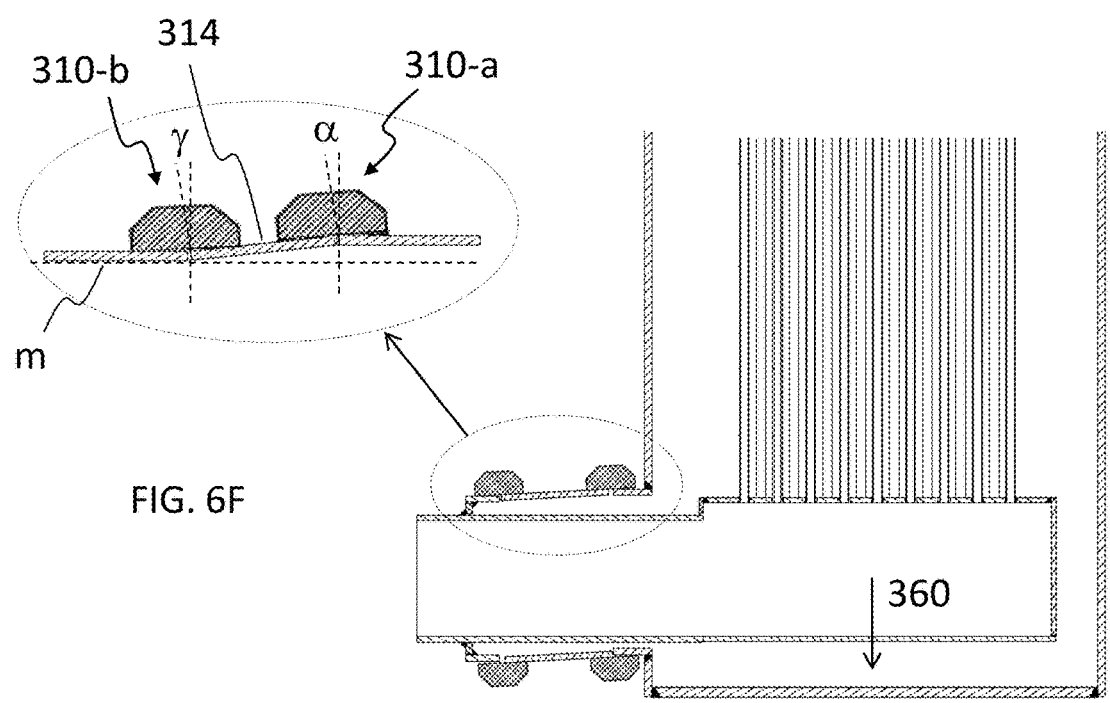
FIG. 6F is a cross-section view of the compliant heating system of FIG. 6A when differential thermal expansion is present.

FIG. 6E and FIG. 6F illustrate an embodiment of how multiple compressive seal expansion joints can accommodate the differential thermal expansion of the heating system, where inner compressive seal expansion joint 310-a and outer compressive seal expansion joint 310-b each independently form an articulated hinge with three degrees of freedom allowing for both axial expansion and angular displacement. FIG. 6E illustrates a cooled state of the compliant heating system and FIG. 6F illustrates a heated state of the compliant heating system undergoing axial expansion 360. Axial expansion 360 of the dynamic components when heated can result in a decrease in the gap width in one or both of inner compressive seal expansion joint 310-a and outer compressive seal expansion joint 310-b. Likewise, axial expansion 360 can result in an angular displacement. The angular displacement can be defined by an angle $\alpha$ or $\gamma$ as measured from a line perpendicular to an initial line, m, defined by combustion gas exhaust port flange 332. $\alpha$ and $\gamma$ can each independently be 0.1° to 45°, or 0.1 to 25°, or 0.5° to 10°, or 0.1 to 5°. Use of more than one compressive seal expansion joint can allow for the axial expansion of the dynamic components without inducing a torque on the rigid structures. Use of more than one compressive seal expansion joint can result in a reduced activation force to deform the compressive seal expansion joint during the axial expansion of the dynamic components.

In comparing the compliant heating systems of FIGS. 4A to 4D, FIGS. 5A to 5D, and FIGS. 6A to 6F it is observed that the exhaust gas port of the compliant heating system of FIGS. 4A to 4D is directed axially away from the compliant heating system, whereas the exhaust gas port of the compliant heating system of FIGS. 5A to 5D, and FIGS. 6A to 6F are directed laterally away from the compliant heating system. In the compliant heating system of FIGS. 4A to 4D, where the exhaust gas port is directed axially away from the compliant heating system, the differential thermal expansion of the dynamic component acts along the axial axis (as denoted by the dashed line in FIG. 4A) of the fluid heating system and is aligned with the applied strain on the compressive seal expansion joint. Likewise, although the exhaust gas port of the compliant heating system of FIGS. 5A to 5D is directed laterally away from the compliant heating system, the presence of the U-tube allows for the resultant strain on the compressive seal expansion joint that arises from the thermal expansion of the dynamic component to be in the same axial direction (i.e., that is parallel to the axial axis). The strain response of the compressive seal expansion joints when the resultant strain is in the lateral direction can be dependent upon the compressive and expansive properties of the gasket material and can result in a linear or non-linear response. In contrast, when the exhaust gas port is directed laterally away (for example, in a direction perpendicular to the axial axis) such that the resultant strain on the compressive seal expansion joint is not in the axial direction, then the lateral redirection of exhaust gases can alter the stress patterns at the downstream end of the hot assembly and can introduce new lateral and radial stress components. The presence of more than one compressive seal expansion joint in the compliant heating system helps to alleviate these new stress components.

In this configuration, the sliding friction forces associated with movement can be negligible or may be eliminated entirely. However, in certain embodiments an internal pressure based force may be present that acts to "straighten" the section of pipe, and relates to the length between the expansion joints, the diameter of the expansion joints and the diameter of the expansion joint. Specifically mentioned is a case where the return force from internal pressure is 1000 to 20,000 pounds force, 2000 to 10,000 pounds force, or 3000 and 7000 pounds force.

Figure 7A:
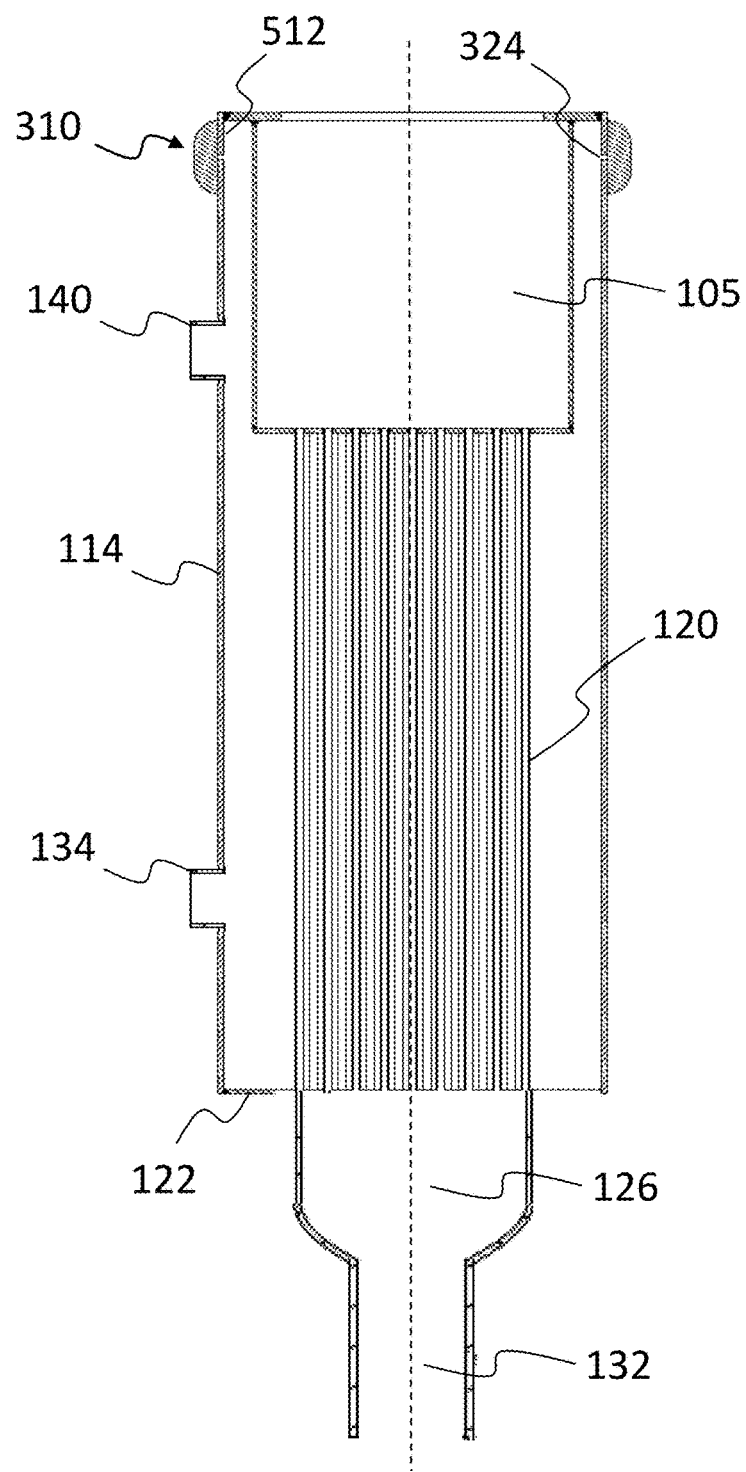
FIG. 7A is a cross-section view of a portion of a compliant heating system having a compliant pressure vessel shell.
Figure 7B:
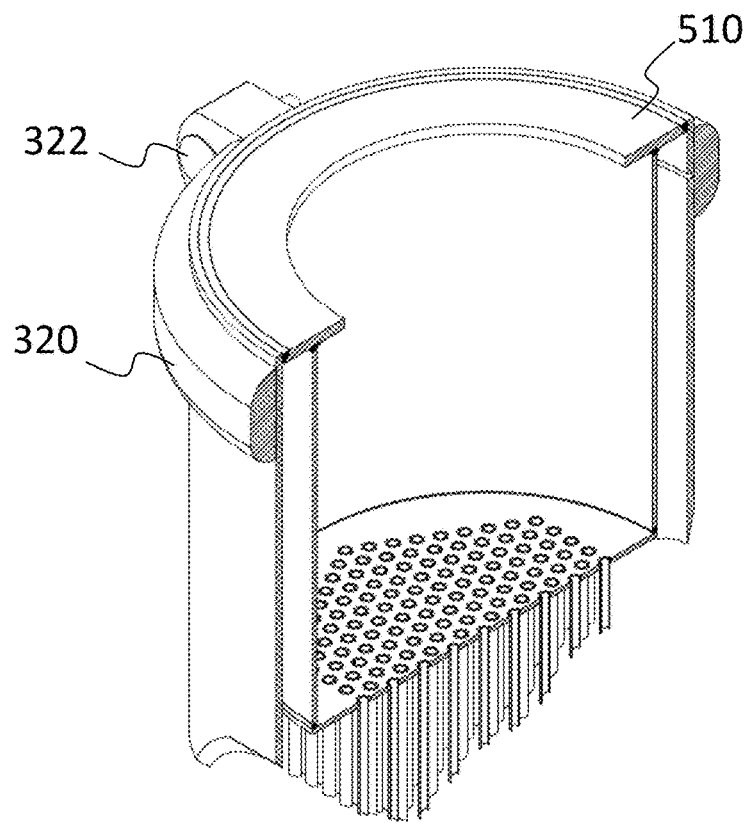
FIG. 7B is perspective cut-away view of the compliant heating system of FIG. 7A.

FIGS. 7A to 7B illustrate an example of a compliant heating system having a compressive seal expansion joint located on the pressure vessel shell. In the embodiment of FIG. 7A, the thermal transfer fluid travels from combustion furnace 105 through heat exchanger tubes 120 to exhaust plenum 126 and exits via exhaust gas port 132. FIG. 7A illustrates that pressure vessel shell 114 can be connected to compliant pressure vessel flange 512 via compressive seal expansion joint 310. Compliant pressure vessel flange 512 can be rigidly connected to top head flange 510, for example, via a weld or compliant pressure vessel flange 512 and top head flange 510 can be a single piece. Compressive seal expansion joint 310 comprises retaining ring 320 located around a gasket, where the gasket is located over expansion gap 324. Retaining ring 320 can be secured via threaded bolt 322, as illustrated in FIG. 7B. It is noted that while compressive seal expansion joint 310 is located proximal to top head flange 510, the reverse configuration is also applicable, where the top head of the pressure vessel shell is rigidly attached and where a compressive seal expansion joint is located on the distal end of the pressure vessel shell.

Also disclosed is a compliant heating system comprising a compressive seal expansion joint located on the pressure vessel shell conduit of the pressure vessel shell, e.g., as shown in FIG. 6A, and compressive seal expansion joint located on the pressure vessel shell, e.g., as shown in FIGS. 7A and 7B. While not wanting to be bound by theory, it is believed that by providing redundant accommodation of thermal stress, improved reliability may be provided. The compressive seal expansion joint located on the pressure vessel shell conduit and the compressive seal expansion joint located on the pressure vessel shell are as previously disclosed, and thus repetitive description is omitted for clarity.

It is observed that in all of the embodiments of FIGS. 4-7 that the compressive seal expansion joint(s) are externally located on either the pressure vessel shell or on an externally located conduit of the pressure vessel shell. As is noted above, the external location of the compressive seal expansion joint allows for field servicing without the use of specialized equipment or complex joining techniques such as welding. This facilitated field servicing can allow for regular inspection of the compressive seal expansion joint for wear, cracking, or fatigue to enable problems to be addressed before component failure. Because the compressive seal expansion joint can be easily inspected, damaged compressive seal expansion joints can be easily replaced prior to failure, resulting in a longer lifetime of the compliant heating system as compared to non-compliant heating systems.

The various components of the compliant heating system can each independently comprise any suitable material. Use of a metal is specifically mentioned. Representative metals include iron, aluminum, magnesium, titanium, nickel, cobalt, zinc, silver, copper, and an alloy comprising at least one of the foregoing. Representative metals include carbon steel, mild steel, cast iron, wrought iron, a stainless steel such as a 300 series stainless steel or a 400 series stainless steel, e.g., 304, 316, or 439 stainless steel, Monel, Inconel, bronze, and brass. Specifically mentioned is an embodiment in which the heat exchanger core and the pressure vessel each comprise steel, specifically stainless steel. The compliant heating system may comprise a furnace, an upper tube sheet, a lower tube sheet, and an exhaust plenum, and the furnace, the upper tube sheet, the lower tube sheet, and the exhaust plenum can each independently comprise any suitable material. Use of a steel, such as mild steel or stainless steel this mentioned. While not wanting to be bound by theory, it is understood that use of stainless steel in the dynamic components can help to keep the components below their respective fatigue limits, potentially eliminating fatigue failure as a failure mechanism.

The disclosed compliant heating system can provide one for more of the following benefits. First, mechanical stress that arises due to the differential thermal expansion of some of the components can be localized to one or more specific locations of the compressive seal expansion joint. Second, the compressive seal expansion joint can be located on an external component of the compliant heating system, such as a pressure vessel shell or on a conduit allowing for easy access for inspection and/or service. Third, in the disclosed configuration, the compressive seal expansion joint can be inspected and/or serviced without welding or specialized techniques or tooling.

An example of a compliant heating system is a boiler, for example, for the production of hot thermal fluids (such as steam, hot water, non-water based fluids, or a combination comprising one or more of the foregoing). The hot thermal fluids can be used for ambient temperature regulation or water heating. The compliant heating system can be used for domestic, commercial, or industrial applications. In the compliant heating system, the thermally-induced mechanical stress can be localized to replaceable, compliant elements on the exterior pressure vessel to provide improved reliability.

The disclosed system can alternately comprise, consist of, or consist essentially of, any appropriate components herein disclosed. The disclosed system can additionally be substantially free of any components or materials used in the prior art that are not necessary to the achievement of the function and/or objectives of the present disclosure.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. "Optional" or "optionally" means that the subsequently described event or circumstance may or may not occur, and that the description includes instances where the event occurs and instances where it does not. The terms "first," "second," and the like, "primary," "secondary," and the like, as used herein do not denote any order, quantity, or importance, but rather are used to distinguish one element from another. The terms "front", "back", "bottom", and/or "top" are used herein, unless otherwise noted, merely for convenience of description, and are not limited to any one position or spatial orientation.

The endpoints of all ranges directed to the same component or property are inclusive of the endpoints, are independently combinable, and include all intermediate points. For example, ranges of "up to 25 N/m, or more specifically 5 to 20 N/m" are inclusive of the endpoints and all intermediate values of the ranges of "5 to 25 N/m," such as 10 to 23 N/m.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Disclosed is a compliant heating system, comprising: a dynamic component comprising a heat exchanger; a pressure vessel shell encompassing at least a portion of the heat exchanger; and a compressive seal expansion joint that connects/joins/is located between the dynamic component and the pressure vessel shell.

Also disclosed is a compliant heating system comprising: a dynamic component comprising a heat exchanger, an exhaust plenum that is disposed on an end of the heat exchanger, and an exhaust gas port; a pressure vessel shell encompassing at least a portion of the heat exchanger and comprising a pressure vessel shell conduit that is disposed along a lateral axis and on an end of the pressure vessel shell, wherein the exhaust gas port laterally extends through the pressure vessel shell conduit; and an inner conduit compressive seal expansion joint and an outer conduit compressive seal expansion joint disposed on the pressure shell conduit, wherein the exhaust gas port is connected to the pressure vessel shell conduit via the inner conduit compressive seal expansion joint and the outer conduit compressive seal expansion joint; wherein the pressure vessel shell conduit comprises a pressure vessel flange; wherein the pressure vessel flange is connected to a first end of a pipe segment via the inner conduit compressive seal expansion joint, wherein a second end of the pipe segment is connected to a combustion gas exhaust port flange via the outer conduit compressive seal expansion joint, and wherein the combustion gas exhaust port flange is rigidly attached to the exhaust port via a connection flange.

Also disclosed is a method of manufacturing a compliant heating system, the method comprising: disposing a dynamic component comprising a heat exchanger in a pressure vessel shell; and connecting the dynamic component and the pressure vessel shell with a compressive seal expansion joint to manufacture the compliant heating system.

Also disclosed is a method of using the compliant heating system of any one of the preceding claims, the method comprising: directing a thermal transfer fluid through the heat exchanger to an exhaust gas port; and transferring heat from the thermal transfer fluid to a production fluid located in an inner production fluid area.

In any of the foregoing of embodiments, a thermal expansion of the dynamic component and a thermal expansion of the pressure vessel when the heat exchanger exchanges heat may be different; and/or the pressure vessel shell may further comprise a pressure vessel shell conduit, and the compressive seal expansion joint may comprises a conduit compressive seal expansion joint disposed on the pressure vessel shell conduit; and/or the pressure vessel shell conduit maybe disposed along an axial axis and on an end of the pressure vessel shell, wherein the dynamic component may further comprise an exhaust plenum, which is disposed on an end of the heat exchanger, wherein the exhaust plenum is connected to an exhaust gas port that axially extends through the pressure vessel shell conduit, and wherein the exhaust gas port is connected to the pressure vessel shell conduit via the conduit compressive seal expansion joint; and/or the pressure vessel shell conduit may comprise a pressure vessel flange, wherein the pressure vessel flange is connected to a combustion gas exhaust port flange via the conduit compressive seal expansion joint, and wherein the combustion gas exhaust port flange is rigidly attached to an exhaust port via a connection flange; and/or the pressure vessel shell conduit maybe disposed along a lateral axis and on an end of the pressure vessel shell, wherein the dynamic component further comprises an exhaust plenum, which is disposed on an end of the heat exchanger, and an exhaust gas port that laterally extends through the pressure vessel shell conduit, and wherein the exhaust gas port is connected to the pressure vessel shell conduit via the conduit compressive seal expansion joint; and/or the pressure vessel shell conduit may have a bend of 0 to 180° relative to a lateral axis of the pressure vessel shell; and/or the pressure vessel shell conduit may have a 90° bend that connects the exhaust plenum and the exhaust gas port, and wherein the bend is in a direction towards in the axial direction of the pressure vessel, wherein an axis of the conduit compressive seal expansion joint is parallel to the axial direction of the of the pressure vessel; and/or the pressure vessel shell conduit may comprise a curved pressure vessel shell conduit, wherein a combustion gas exhaust port flange is connected to the conduit compressive seal expansion joint opposite the curved pressure vessel shell conduit, and wherein the combustion gas exhaust port flange is rigidly attached to the exhaust port via a connection flange; and/or the conduit compressive seal expansion joint maybe located on the lateral axis; and/or the pressure vessel shell conduit may comprise a pressure vessel flange, wherein the pressure vessel flange is connected to a first end of a pipe segment via an inner conduit compressive seal expansion joint, wherein a second end of the pipe segment is connected to a combustion gas exhaust port flange via an outer conduit compressive seal expansion joint, and wherein the combustion gas exhaust port flange is rigidly attached to the exhaust port via a connection flange; and/or the compressive seal expansion joint may comprise a shell compressive seal expansion joint located on a side of the pressure vessel shell; and/or the pressure vessel shell may comprise a lower tube sheet which is rigidly connected the heat exchanger, wherein the heat exchanger is in fluid communication with an exhaust plenum through the lower tube sheet, and wherein the shell compressive seal expansion joint is located at an end of the pressure vessel shell which is distal to the exhaust plenum; and/or the dynamic component may further comprise an exhaust plenum, wherein the exhaust plenum is connected to an exhaust gas port that extends through the pressure vessel shell; and/or the shell compressive seal expansion joint may be located at an end of the pressure vessel shell which is proximal to an exhaust plenum; and/or the pressure vessel shell may be connected to a compliant pressure vessel flange via the shell compressive seal expansion joint, and wherein the compliant pressure vessel flange is rigidly attached to a top head flange; and/or the compressive seal expansion joint may be removable; and/or the compressive seal expansion joint may comprise a retaining ring comprising an internal channel, wherein a gasket is located in the internal channel; and/or the compressive seal expansion joint may be configured to accommodate a change in a gap width of an expansion gap; and/or the compressive seal expansion joint may be configured to accommodate a change in an angle of an expansion gap; and/or the compressive seal expansion joint may comprise a retaining ring comprising a positioner; and/or the compressive seal expansion joint may be displaced upon heating of the compliant heating system in response to a combined sliding friction activation force and pressure induced return force between 1,000 pounds force and 12,000 pounds force; and/or the compliant heating system may comprise two or more compressive seal expansion joints; and/or the dynamic component may further comprise a combustion furnace; and/or the combustion furnace may be disposed in the pressure vessel shell; and/or the dynamic component may further comprise an exhaust plenum; and/or the heat exchanger may comprise a plurality of heat exchanger tubes.

We claim:

1. A compliant heating system, comprising:
   a dynamic component comprising a heat exchanger having a plurality of tubes fluidically connected to an exhaust plenum that is fluidically connected to an exhaust port along which flows exhaust from the heat exchanger;
   a pressure vessel encompassing at least a portion of the heat exchanger wherein the exhaust port sealingly penetrates the pressure vessel to provide the exhaust outside of the pressure vessel;
   at least one expansion joint that detachably connects the dynamic component and the pressure vessel, the expansion joint configured to reduce thermally-induced stress on the dynamic component in operation; and
   wherein the pressure vessel comprises a pressure vessel conduit, the exhaust port is sealingly attached to the pressure vessel conduit, and the at least one expansion joint is directly externally accessible and detachably disposed on an exterior surface of the pressure vessel conduit and detachable from outside of the heating system.

2. The compliant heating system of claim 1, wherein a thermal expansion of the dynamic component and a thermal expansion of the pressure vessel when the heat exchanger exchanges heat are different.

3. The compliant heating system of claim 1,
   wherein the pressure vessel conduit comprises a pressure vessel flange,
   wherein the pressure vessel flange is connected to an exhaust port flange via the at least one expansion joint, and
   wherein the exhaust port flange is rigidly attached to the exhaust port via a connection flange.

4. The compliant heating system of claim 1,
   wherein the at least one expansion joint is disposed on an exterior surface of the pressure vessel conduit and the pressure vessel conduit is disposed at least partially along a lateral axis and near an end of the pressure vessel,
   wherein the
   exhaust port laterally extends through the pressure vessel conduit, and
   wherein the exhaust port is connected to the pressure vessel conduit via the at least one expansion joint.

5. The compliant heating system of claim 1, wherein the at least one expansion joint is detachably disposed on an exterior surface of the pressure vessel conduit and the pressure vessel conduit has a bend of 0 to 180° relative to a lateral axis of the pressure vessel.

6. The compliant heating system of claim 5,
   wherein the pressure vessel conduit has a 90° bend, and
   wherein the bend is in a direction towards in an axial direction of the pressure vessel, and
   wherein an axis of the expansion joint is parallel to the axial direction of the pressure vessel.

7. The compliant heating system of claim 4,
   wherein the pressure vessel conduit comprises a curved pressure vessel conduit,
   wherein a combustion gas exhaust port flange is connected to the expansion joint opposite the curved pressure vessel conduit, and
   wherein the combustion gas exhaust port flange is rigidly attached to the exhaust port via a connection flange.

8. The compliant heating system of claim 4, wherein the at least one expansion joint comprises a plurality of expansion joints disposed along the lateral axis and configured to reduce stress from angular displacement caused by thermal expansion.

9. The compliant heating system of claim 4,
   wherein the pressure vessel conduit comprises a pressure vessel flange,
   wherein the pressure vessel flange is connected to a first end of a pipe segment via an inner expansion joint,
   wherein a second end of the pipe segment is connected to an exhaust port flange via an outer expansion joint, and
   wherein the exhaust port flange is rigidly attached to the exhaust port via a connection flange.

10. The compliant heating system of claim 1,
    wherein the exhaust port extends through the pressure vessel.

11. The compliant heating system of claim 1, wherein the at least one expansion joint is displaced, upon heating of the compliant heating system, in response to a combined sliding friction activation force and pressure induced return force of 1,000 pounds force to 12,000 pounds force.

12. The compliant heating system of claim 1, wherein the compliant heating system comprises two or more expansion joints.

13. The system of claim 1, wherein the at least one expansion joint is detachably disposed on an exterior surface of the pressure vessel conduit and connects a respective expansion gap in the pressure vessel conduit which seals the respective expansion gap and allows expansion of the dynamic component relative to the pressure vessel.

14. The system of claim 13, wherein the at least one expansion joint comprises:
    a removable gasket disposed across a respective expansion gap; and
    a removable retaining ring disposed around the gasket, which secures the gasket in place.

15. The system of claim 14, wherein the gasket comprises an elastomer.

16. The system of claim 14, wherein the retaining ring comprises an internal channel arranged to house the gasket.

17. The system of claim 14, further comprising one or more positioners arranged to guide the retaining ring to maintain position on the pressure vessel.

18. A compliant heating system, comprising:
a dynamic component comprising a heat exchanger having a plurality of tubes fluidically connected to an exhaust plenum that is fluidically connected to an exhaust port along which flows exhaust from the heat exchanger;
a pressure vessel encompassing at least a portion of the heat exchanger wherein the exhaust port sealingly penetrates the pressure vessel to provide the exhaust outside of the pressure vessel, wherein a thermal expansion of the dynamic component and a thermal expansion of the pressure vessel when the heat exchanger exchanges heat are different;
at least one detachably removable expansion joint that detachably connects the dynamic component and the pressure vessel and is configured to reduce thermally-induced stress on the dynamic component; and
wherein the pressure vessel comprises a pressure vessel conduit, the exhaust port is sealingly attached to the pressure vessel conduit, and the at least one expansion joint is directly externally accessible and detachably disposed on an exterior surface of the pressure vessel conduit and detachable from outside the heating system.

19. A compliant heating system, comprising:
a dynamic component comprising a heat exchanger having a plurality of tubes fluidically connected to an exhaust plenum that is fluidically connected to an exhaust port along which flows exhaust from the heat exchanger;
a pressure vessel encompassing at least a portion of the heat exchanger wherein the exhaust port sealingly penetrates the pressure vessel to provide the exhaust outside of the pressure vessel, wherein a thermal expansion of the dynamic component and a thermal expansion of the pressure vessel when the heat exchanger exchanges heat are different;
at least one expansion joint that detachably connects the dynamic component and the pressure vessel; and
wherein the pressure vessel comprises a pressure vessel conduit, the exhaust port is sealingly attached to the pressure vessel conduit, and the at least one expansion joint is exposed to an exterior surface of the pressure vessel conduit and is directly accessible and detachable from outside the heating system.

20. The compliant heating system of claim 1 wherein the at least one expansion joint comprises a plurality of expansion joints detachably disposed on an external surface of the heating system and configured to reduce stress from angular displacement caused by thermal expansion.

* * * * *